(12) United States Patent
Komori

(10) Patent No.: US 10,340,556 B2
(45) Date of Patent: Jul. 2, 2019

(54) BATTERY CELL, BATTERY MODULE, DETECTION SYSTEM, AND DETERMINATION SYSTEM

(71) Applicant: Panasonic Intellectual Property Management Co., Ltd., Osaka (JP)

(72) Inventor: Tomoyuki Komori, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 60 days.

(21) Appl. No.: 15/478,287

(22) Filed: Apr. 4, 2017

(65) Prior Publication Data
US 2017/0309968 A1    Oct. 26, 2017

(30) Foreign Application Priority Data

Apr. 25, 2016    (JP) ................................. 2016-086783

(51) Int. Cl.
| | | |
|---|---|---|
| *H01M 10/42* | (2006.01) | |
| *H01M 10/48* | (2006.01) | |
| *H01M 10/0562* | (2010.01) | |

(52) U.S. Cl.
CPC ..... *H01M 10/425* (2013.01); *H01M 10/4285* (2013.01); *H01M 10/48* (2013.01); *H01M 10/0562* (2013.01); *H01M 2010/4271* (2013.01); *H01M 2300/0068* (2013.01)

(58) Field of Classification Search
None
See application file for complete search history.

(56) References Cited

U.S. PATENT DOCUMENTS

| | | | |
|---|---|---|---|
| 2004/0063215 A1* | 4/2004 | Horiuchi | G01N 27/12 436/121 |
| 2007/0229294 A1 | 10/2007 | Vossmeyer et al. | |
| 2010/0285349 A1* | 11/2010 | Goto | H01M 10/0525 429/156 |

(Continued)

FOREIGN PATENT DOCUMENTS

| | | |
|---|---|---|
| JP | 2007-304086 | 11/2007 |
| JP | 2009-193727 | 8/2009 |
| WO | 2011/074097 | 6/2011 |

*Primary Examiner* — Alix E Eggerding
(74) *Attorney, Agent, or Firm* — McDermott Will & Emery LLP

(57) ABSTRACT

A battery cell includes a first resistance change member having first and second terminals, a first power generation element including a first positive electrode, a first negative electrode, and a first electrolyte interposed between the first positive electrode and the first negative electrode, a first case enclosing the first power generation element and the first resistance change member, and first positive and negative electrode terminals. At least one of the first positive electrode, the first negative electrode, and the first electrolyte contains a first sulfur-based material. The first resistance change member contains a first resistance change material of which electrical resistance is changed by a chemical reaction with hydrogen sulfide. The first and second terminals of the first resistance change member are exposed to the outside of the first case, and the first resistance change member is not electrically connected to any of the first positive and negative electrode terminals.

5 Claims, 19 Drawing Sheets

(56) References Cited

U.S. PATENT DOCUMENTS

2010/0297479 A1* 11/2010 Tsuchida ................ H01M 6/18
                                                                                       429/49
2012/0286793 A1   11/2012 Kawaoka et al.
2017/0098940 A1*  4/2017 Syouda ................ G01R 31/36

* cited by examiner

BATTERY CELL, BATTERY MODULE, DETECTION SYSTEM, AND DETERMINATION SYSTEM

BACKGROUND

1. Technical Field

The present disclosure relates to a battery cell, a battery module, a detection system, and a determination system.

2. Description of the Related Art

Japanese Patent No. 5459319 discloses a vehicle system including at least one sulfide-based solid electrolyte battery cell, wherein the sulfide-based solid electrolyte battery cell includes, at least, at least one power generation unit including a positive electrode, a negative electrode, and an electrolyte interposed between the positive electrode and the negative electrode, and a housing that houses the power generation unit, wherein at least any one of the positive electrode, the negative electrode, and the electrolyte contains a sulfur-based material, and wherein at least any one of a current collector and leads both constituting charge-discharge paths, and leads connected to an associated circuit, which is associated with the charge-discharge paths, contains a material of which electrical resistance is changed by a chemical reaction with hydrogen sulfide.

Japanese Patent No. 4692556 discloses an all-solid-state lithium secondary battery regeneration device in which an outer casing includes, in a sealed manner, an oxide-layer-containing power generation element including an oxide layer that is obtained by oxidation of a sulfide-based solid electrolyte material substantially not containing moisture, the oxide layer being positioned at a location where an electrolyte-containing layer containing at least the sulfide-based solid electrolyte material and ambient air are contacted with each other, the all-solid-state lithium secondary battery regeneration device including an outer-casing drying device that dries the interior of the outer casing and removes moisture, and a hydrogen sulfide sensor that is disposed inside the outer casing, wherein when the hydrogen sulfide sensor detects hydrogen sulfide inside the outer casing, the outer-casing drying device is operated to dry the interior of the outer casing and to remove moisture for regeneration of the oxide layer that is obtained by oxidation of the sulfide-based solid electrolyte material substantially not containing moisture.

SUMMARY

High accuracy in detection of hydrogen sulfide cannot be realized with the related art.

In one general aspect, the techniques disclosed here feature a battery cell including a first resistance change member having a first terminal and a second terminal, a first power generation element including a first positive electrode, a first negative electrode, and a first electrolyte interposed between the first positive electrode and the first negative electrode, a first case enclosing the first power generation element and the first resistance change member, a first positive electrode terminal having an end electrically connected to the first positive electrode and an end exposed to the outside of the first case, and a first negative electrode terminal having an end electrically connected to the first negative electrode and an end exposed to the outside of the first case, wherein at least one of the first positive electrode, the first negative electrode, and the first electrolyte contains a first sulfur-based material, wherein the first resistance change member contains a first resistance change material of which electrical resistance is changed by a chemical reaction with hydrogen sulfide, wherein the first terminal of the first resistance change member and the second terminal of the first resistance change member are exposed to the outside of the first case, and wherein the first resistance change member is not electrically connected to any of the first positive electrode terminal and the first negative electrode terminal.

According to the present disclosure, high accuracy in detection of hydrogen sulfide can be realized.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Embodiments of the present disclosure will be described below with reference to the drawings.

First Embodiment

Figure 1A:
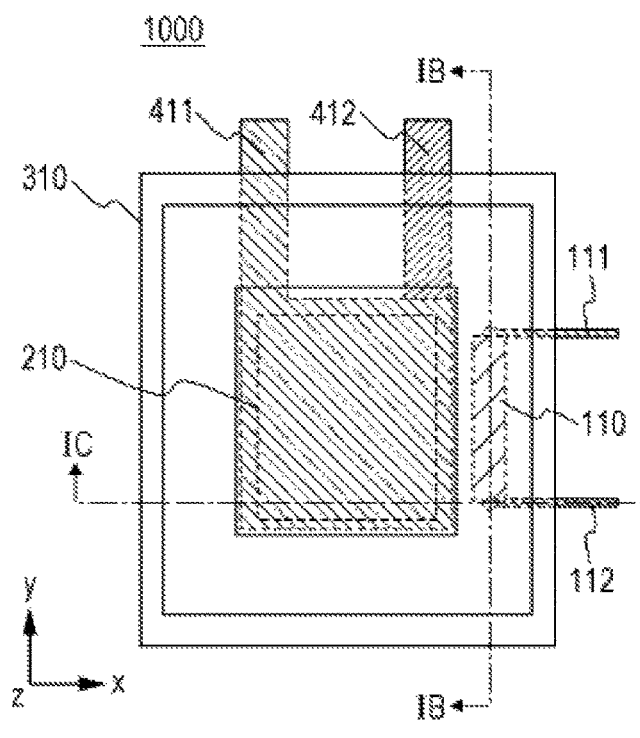
FIGS. 1A, 1B and 1C schematically illustrate a configuration of a battery cell according to a first embodiment.
Figure 1B:
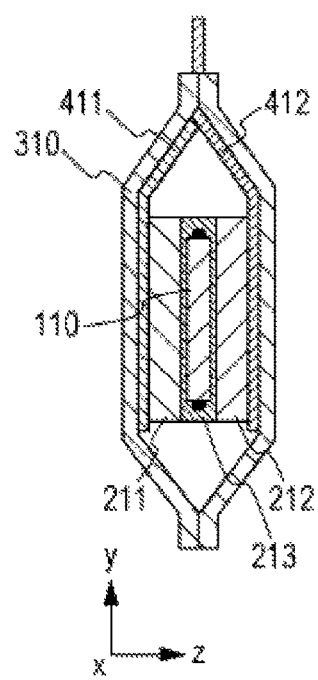
Figure 1C:
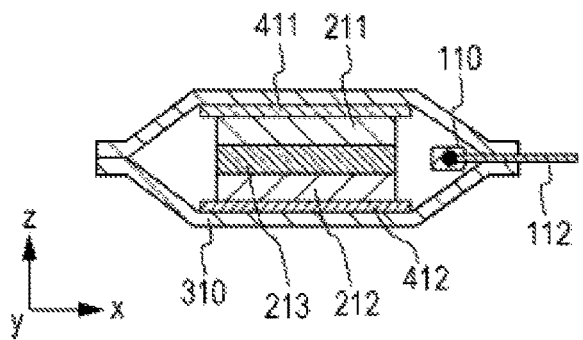

FIGS. 1A, 1B and 1C schematically illustrate a configuration of a battery cell 1000 according to a first embodiment.

FIG. 1A is an x-y view (plan view in a seeing-through way) schematically illustrating the configuration of the battery cell 1000 according to the first embodiment.

FIG. 1B is a z-y view (sectional view taken along a line IB-IB) schematically illustrating the configuration of the battery cell 1000 according to the first embodiment.

FIG. 1C is an x-z view (sectional view taken along a line IC-IC) schematically illustrating the configuration of the battery cell 1000 according to the first embodiment.

The battery cell 1000 according to the first embodiment includes a first resistance change member 110, a first power generation element 210, a first case 310, a first positive electrode terminal 411, and a first negative electrode terminal 412.

The first resistance change member 110 includes a first terminal 111 and a second terminal 112.

The first power generation element 210 includes a first positive electrode 211, a first negative electrode 212, and a first electrolyte 213.

The first electrolyte 213 is interposed between the first positive electrode 211 and the first negative electrode 212.

The first case 310 encloses (e.g., contains) the first power generation element 210 and the first resistance change member 110.

The first positive electrode terminal 411 has an end that is electrically connected to the first positive electrode 211, and an end that is exposed to the outside of the first case 310.

The first negative electrode terminal 412 has an end that is electrically connected to the first negative electrode 212, and an end that is exposed to the outside of the first case 310.

At least one of the first positive electrode 211, the first negative electrode 212, and the first electrolyte 213 contains a first sulfur-based material.

The first resistance change member 110 contains a first resistance change material of which electrical resistance is changed by a chemical reaction with hydrogen sulfide.

The first terminal 111 of the first resistance change member 110 and the second terminal 112 of the first resistance change member 110 are both exposed to the outside of the first case 310.

The first resistance change member 110 is not electrically connected to any of the first positive electrode terminal 411 and the first negative electrode terminal 412.

With the configuration described above, accuracy in detection of hydrogen sulfide can be increased. More specifically, since the first resistance change member 110 is independently disposed without being electrically connected to any of the first positive electrode terminal 411 and the first negative electrode terminal 412, it is not affected by variations of a resistance value, which are attributable to, e.g., a charge-discharge state or a deterioration state of the first power generation element 210. In other words, the first resistance change member 110 does not cause erroneous detection attributable to the electrodes. Therefore, only when hydrogen sulfide is generated inside the first case 310 and the electrical resistance of the first resistance change material is changed, the electrical resistance of the first resistance change member 110 is changeable to a large extent. As a result, the detection of hydrogen sulfide possibly generated attributable to the first sulfur-based material can be performed with higher accuracy. Furthermore, since the first resistance change member 110 and the first power generation element 210 are independent of each other, charge-discharge characteristics of the first power generation element 210 are not deteriorated with the presence of the first resistance change member 110 (or change in resistance value of the first resistance change member 110). Thus, the hydrogen sulfide can be detected with high accuracy without affecting the charge-discharge characteristics of the first power generation element 210. Moreover, because of the first resistance change member 110 and the first power generation element 210 being independent of each other, even when the first power generation element 210 is adaptable for charging and discharging operations at a large current, the first resistance change member 110 is not required to have a configuration to be adapted for such a large current. Accordingly, a configuration (material) optimum for detecting hydrogen sulfide can be selected as a configuration of the first resistance change member 110 (as a first resistance change material, for example).

On the other hand, in the case where the first resistance change member 110 and the first power generation element 210 are connected to each other (such as disclosed in, e.g., Japanese Patent No. 5459319), a resistance value may be increased attributable to, e.g., deterioration of the first power generation element 210. In that case, generation of hydrogen sulfide may be detected erroneously.

With the above-described configuration of the first embodiment, when the first resistance change member 110 is disposed in a one-to-one relation to the battery cell, detection of hydrogen sulfide can be performed for each of the battery cells. In other words, the battery cells in which hydrogen sulfide has generated can be individually found in units of one cell. Therefore, the battery cells in which hydrogen sulfide has generated can be individually replaced in units of one cell, for example. Thus, even when hydrogen sulfide is detected, for example, in a battery module constituted by the plurality of battery cells, it is not required to replace the battery cells in an excessive number (e.g., a set of battery cells including normal battery cells as well, or the entirety of the battery module). As a result, maintenance of the battery module constituted by the plurality of battery cells can be performed in an efficient and simple manner.

On the other hand, in the case where one hydrogen-sulfide sensor is disposed for a plurality of battery cells (such as disclosed in, e.g., Japanese Patent No. 4692556), it is impossible to individually detect in which one of the battery cells hydrogen sulfide has generated.

In the battery cell 1000 according to the first embodiment, the first resistance change member 110 may have a mesh structure containing the first resistance change material, or a porous structure containing the first resistance change material.

Such a feature is able to increase an area for reaction with hydrogen sulfide. As a result, sensitivity in the detection of hydrogen sulfide can be further increased.

The above-mentioned mesh structure or porous structure may be disposed, for example, in a part of the first resistance change member 110, which is incorporated within the first case 310, other than the first terminal 111 and the second terminal 112 of the first resistance change member 110.

In the battery cell 1000 according to the first embodiment, the first resistance change material may be at least one metal or an alloy of two or more metals selected from a group consisting of copper, nickel, iron, molybdenum, gold, silver, silicon, germanium, samarium, zirconium, tin, tantalum, lead, niobium, nickel, neodymium, platinum, hafnium, palladium, magnesium, manganese, and lanthanum.

Such a feature is able to further increase the sensitivity in the detection of hydrogen sulfide.

Furthermore, in the battery cell 1000 according to the first embodiment, as illustrated in FIG. 1, the first resistance change member 110 may be arranged inside the first case 310 on the side different from the side where the first positive electrode terminal 411 and the first negative electrode terminal 412 are exposed.

Alternatively, the first resistance change member 110 may be arranged inside the first case 310 on the same side as the side where the first positive electrode terminal 411 or the first negative electrode terminal 412 is exposed.

In the battery cell 1000 according to the first embodiment, as illustrated in FIG. 1, the first terminal 111 and the second terminal 112 of the first resistance change member 110 may be both exposed (for example, led out) from the same one of lateral surfaces of the first case 310.

Alternatively, the first terminal 111 and the second terminal 112 of the first resistance change member 110 may be exposed (for example, led out) from different ones of the lateral surfaces of the first case 310.

In the battery cell 1000 according to the first embodiment, as illustrated in FIG. 1, the first terminal 111 and the second terminal 112 of the first resistance change member 110 may be exposed (for example, led out) from one of the lateral surfaces of the first case 310, the one being different from the other lateral surface where the first positive electrode terminal 411 or the first negative electrode terminal 412 is exposed.

Alternatively, the first terminal 111 and the second terminal 112 of the first resistance change member 110 may be exposed (for example, led out) from the same one of the lateral surfaces of the first case 310 as the lateral surface where the first positive electrode terminal 411 or the first negative electrode terminal 412 is exposed.

In the battery cell 1000 according to the first embodiment, as illustrated in FIG. 1, one end of the first positive electrode terminal 411 and one end of the first negative electrode terminal 412 may be exposed (for example, led out) from the same one of the lateral surfaces of the first case 310.

Alternatively, the one end of the first positive electrode terminal 411 and the one end of the first negative electrode terminal 412 may be exposed (for example, led out) from different ones of the lateral surfaces of the first case 310.

Moreover, in the battery cell 1000 according to the first embodiment, the first resistance change member 110 is not electrically connected to any of the first positive electrode terminal 411, the first negative electrode terminal 412, and the first power generation element 210. Thus, the first resistance change member 110 is not electrically connected to charge-discharge paths that are constituted by the first positive electrode terminal 411, the first negative electrode terminal 412, and the first power generation element 210. In other words, the first resistance change member 110 is electrically completely independent of the charge-discharge paths.

In the battery cell 1000 according to the first embodiment, the first case 310 may contain the first power generation element 210 and a part of the first resistance change member 110 (e.g., a portion including the first resistance change material) in an enclosed state. In that case, a sealant (e.g., a resin) or the like may be applied for sealing and enclosing purposes to a portion of the first case 310, the portion being contacted with each of the first terminal 111 and the second terminal 112 of the first resistance change member 110, the first positive electrode terminal 411, and the first negative electrode terminal 412.

In the battery cell 1000 according to the first embodiment, as illustrated in FIG. 1, the first case 310 may be a laminated type case. Alternatively, the first case 310 may be a case having a rectangular, cylindrical, or coin-like shape.

A material of the first case 310 may be selected from known materials that are generally used for battery cases.

In the battery cell 1000 according to the first embodiment, as illustrated in FIG. 1, the end of the first positive electrode terminal 411, which end is electrically connected to the first positive electrode 211, may be directly contacted with the first positive electrode 211. Thus, the end of the first positive electrode terminal 411, which end is electrically connected to the first positive electrode 211, may be a positive electrode current collector.

In the battery cell 1000 according to the first embodiment, as illustrated in FIG. 1, the end of the first negative electrode terminal 412, which end is electrically connected to the first negative electrode 212, may be directly contacted with the first negative electrode 212. Thus, the end of the first negative electrode terminal 412, which end is electrically connected to the first negative electrode 212, may be a negative electrode current collector.

Figure 2:
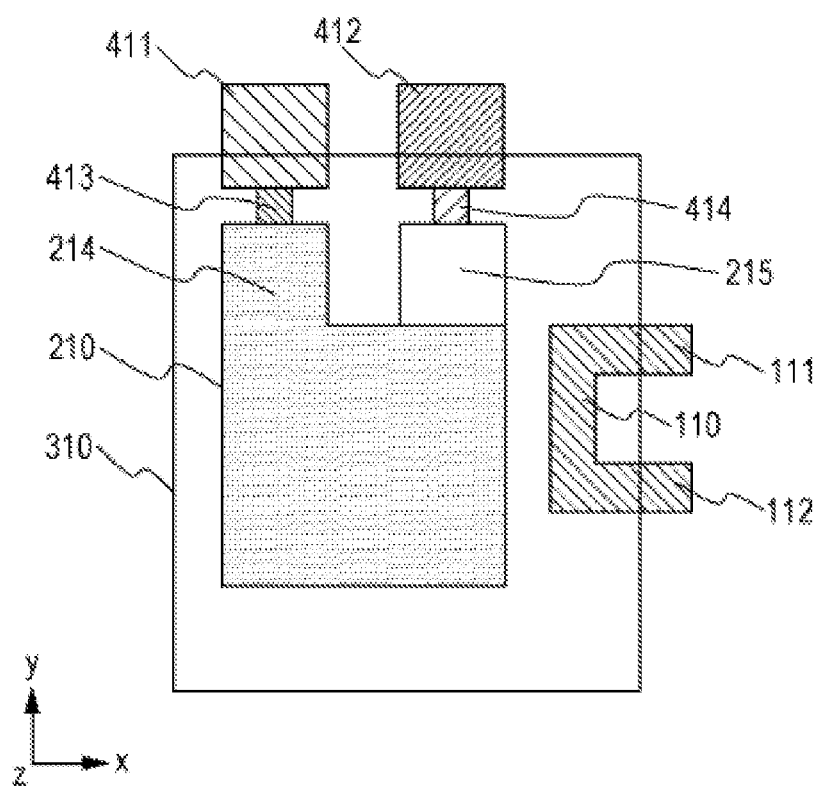
FIG. 2 is a sectional view schematically illustrating a configuration of a modification of the battery cell according to the first embodiment.

FIG. 2 is a sectional view schematically illustrating a configuration of a modification of the battery cell 1000 according to the first embodiment.

The modification illustrated in FIG. 2 includes, in addition to the above-described configuration of the battery cell 1000, a first positive electrode current collector 214, a first positive electrode lead 413, a first negative electrode current collector 215, and a first negative electrode lead 414.

The first positive electrode current collector 214 is electrically connected to the first positive electrode 211. The first positive electrode current collector 214 and the first positive electrode terminal 411 are connected to each other through the first positive electrode lead 413.

The first negative electrode current collector 215 is electrically connected to the first negative electrode 212. The first negative electrode current collector 215 and the first negative electrode terminal 412 are connected to each other through the first negative electrode lead 414.

In the modification illustrated in FIG. 2, the first resistance change member 110 is not electrically connected to any of the first positive electrode terminal 411, the first positive electrode current collector 214, the first positive electrode lead 413, the first negative electrode terminal 412, the first negative electrode current collector 215, the first negative electrode lead 414, and the first power generation element 210.

Furthermore, in the modification illustrated in FIG. 2, the first terminal 111 and the second terminal 112 of the first resistance change member 110 are also formed of the first resistance change material. Thus, the first resistance change member 110 is formed such that not only a portion incorporated within the first case 310, but also terminal portions exposed from the first case 310 are formed of the same material and have the same structure (for example, in the form of a plate).

The first power generation element 210 in the first embodiment is a power generation unit having charge and discharge characteristics, for example.

A practical example of the first power generation element 210 in the first embodiment will be described below.

The first positive electrode 211 may be disposed, for example, as a positive electrode layer containing a material (e.g., a positive electrode active material) adapted for charging and discharging through the first positive electrode. In that case, the positive electrode layer may be disposed as a positive electrode composite layer containing a conductive aid, a binder, a solid electrolyte, etc. together with the positive electrode active material.

The positive electrode active material may be, for example, a material that occludes and releases metal ions. The positive electrode active material may be, for example, a material that occludes and releases lithium ions. The positive electrode active material may be, for example, a transition metal oxide containing lithium ions, a transition metal fluoride, a polyanion or fluorinated polyanion material, or a transition metal sulfide. In the case of using the transition metal oxide containing lithium ions, it is possible to reduce a manufacturing cost and to increase an average discharge voltage.

A thickness of the positive electrode composite layer may be 10 to 500 µm. If the thickness of the positive electrode composite layer is smaller than 10 µm, there would be a possibility that a difficulty may occur in ensuring a sufficient level of battery energy density. If the thickness of the positive electrode composite layer is larger than 500 µm, there would be a possibility that a difficulty may occur in performing an operation at a high output.

The positive electrode current collector may be in the form of, e.g., a porous or non-porous sheet or film that is made of a metal material such as aluminum, stainless steel, titanium, or an alloy thereof. Aluminum and an aluminum alloy are inexpensive and are easy to form a thin film. The sheet or the film may be a metal foil or mesh, for example.

A thickness of the positive electrode current collector may be 1 to 30 µm. If the thickness of the positive electrode current collector is smaller than 1 µm, mechanical strength would be insufficient, and the current collector would be more apt to crack or break. If the thickness of the positive electrode current collector is larger than 30 µm, there would be a possibility that the battery energy density may decrease.

The first negative electrode 212 may be disposed, for example, as a negative electrode layer containing a material (e.g., a negative electrode active material) adapted for charging and discharging through the first negative electrode 212. In that case, the negative electrode layer may be disposed as a negative electrode composite layer containing a conductive aid, a binder, a solid electrolyte, etc. together with the negative electrode active material.

The negative electrode active material may be, for example, a material that occludes and releases metal ions. The negative electrode active material may be, for example, a material that occludes and releases lithium ions. The negative electrode active material may be, for example, a lithium metal, a metal or an alloy exhibiting an alloying reaction with lithium, carbon, a transition metal oxide, or a transition metal sulfide. The carbon may be, for example, graphite or non-graphite carbon such as hard carbon or coke. The transition metal oxide may be, for example, CuO or NiO. The transition metal sulfide may be, for example, copper sulfide expressed by CuS. The metal or the alloy exhibiting an alloying reaction with lithium may be, for example, a silicon compound, a tin compound, an aluminum compound, or an alloy thereof with lithium. In the case of using the carbon, it is possible to reduce a manufacturing cost and to increase an average discharge voltage.

A thickness of the negative electrode composite layer may be 10 to 500 µm. If the thickness of the negative electrode composite layer is smaller than 10 µm, there would be a possibility that a difficulty may occur in ensuring a sufficient level of battery energy density. If the thickness of the negative electrode composite layer is larger than 500 µm, there would be a possibility that a difficulty may occur in performing an operation at a high output.

The negative electrode current collector may be in the form of, e.g., a porous or non-porous sheet or film that is made of a metal material such as stainless steel, nickel, copper, or an alloy thereof. Copper and a copper alloy are inexpensive and are easy to form a thin film. The sheet or the film may be a metal foil or mesh, for example.

A thickness of the negative electrode current collector may be 1 to 30 µm. If the thickness of the negative electrode current collector is smaller than 1 µm, mechanical strength would be insufficient, and the current collector would be more apt to crack or break. If the thickness of the negative electrode current collector is larger than 30 µm, there would be a possibility that the battery energy density may decrease.

The first electrolyte 213 may be, for example, a sulfide-based solid electrolyte. In that case, the battery cell 1000 is constituted as an all-solid-state battery cell.

The first electrolyte 213 may be disposed, for example, as an electrolyte layer containing a material (e.g., a sulfide-based solid electrolyte) adapted for the first electrolyte 213. In that case, the electrolyte layer may contain a conductive aid, a binder, etc. together with the material of the first electrolyte 213.

The sulfide-based solid electrolyte may be, for example, $Li_2S-P_2S_5$, $Li_2S-SiS_2$, $Li_2S-B_2S_3$, $Li_2S-GeS_2$, $Li_{3.25}Ge_{0.25}P_{0.75}S_4$, or $Li_{10}GeP_2S_{12}$. Furthermore, for example, LiX (X: F, Cl, Br, I), $MO_y$, or $Li_xMO_y$ (M: any of P, Si, Ge, B, Al, Ga and In) (x, y: natural number) may be added to the above-mentioned material. $Li_2S-P_2S_5$ has high ion conductivity, is less apt to be reduced at a low potential, and has a low level of particle hardness. With the use of $Li_2S-P_2S_5$, therefore, manufacturing of a product as a battery is facilitated, and a battery having a high energy density can be obtained.

The conductive aid may be made of a material selected from, for example, graphites such as natural graphite and artificial graphite, carbon blacks such as acetylene black and Ketjen black, conductive fibers such as carbon fiber and metal fiber, metal powders such as made of carbon fluoride and aluminum, conductive whiskers such as made of zinc oxide and potassium titanium, conductive metal oxides such as titanium oxide, and conductive polymer compounds such as polyaniline, polypyrrole and polythiophene. In the case of using the carbon conductive aid, cost reduction can be realized. An electrode resistance can be reduced with the conductive aid contained in the electrolyte layer.

The binder may be, for example, polyvinylidene fluoride, polytetrafluoroethylene, polyethylene, polyacrylonitrile, hexafluoropolypropylene, styrene-butadiene rubber, or carboxymethyl cellulose. Contact properties between materials or flexibility can be increased with the binder contained in the electrolyte layer.

At least one of the first positive electrode 211, the first negative electrode 212, and the first electrolyte 213 contains a first sulfur-based material.

The first sulfur-based material may be, for example, the above-mentioned sulfide-based solid electrolyte.

The first power generation element 210 may have, e.g., a spirally-wound electrode group structure, a laminated electrode group structure, a zigzag-folded electrode group structure, or a combination thereof, each of those electrode group structures being constituted by the positive electrode layer, the negative electrode layer, and the solid electrolyte layer.

Moreover, in the battery cell 1000 according to the first embodiment, the first power generation element 210 may include one laminate that is formed by successively stacking the positive electrode layer, the negative electrode layer, and the electrolyte layer, as illustrated in FIG. 1.

Alternatively, the first power generation element 210 may include two or more laminates each of which is formed by successively stacking the positive electrode layer, the negative electrode layer, and the electrolyte layer.

The battery cell according to the first embodiment may be used to constitute an all-solid-state lithium secondary battery (rechargeable battery), for example.

Second Embodiment

A second embodiment will be described below. Description overlapped with the above description of the first embodiment is omitted as appropriate.

Figure 3:
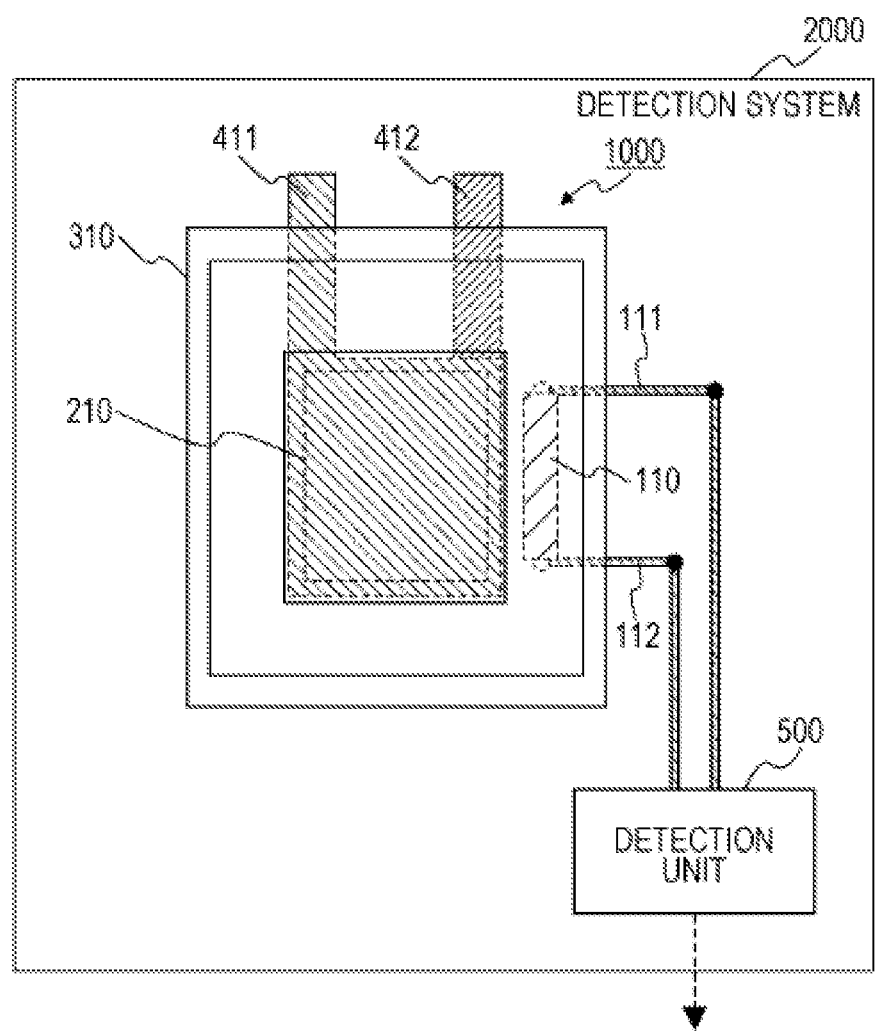
FIG. 3 schematically illustrates a configuration of a detection system according to a second embodiment.

FIG. 3 schematically illustrates a configuration of a detection system 2000 according to the second embodiment.

The detection system 2000 according to the second embodiment includes the above-described battery cell 1000 (=first battery cell) according to the first embodiment, and a detection unit 500.

The detection unit 500 applies a current between the first terminal 111 of the first resistance change member 110 and the second terminal 112 of the first resistance change member 110. At that time, the detection unit 500 detects, as a first detection value, a voltage between the first terminal 111 of the first resistance change member 110 and the second terminal 112 of the first resistance change member 110.

Alternatively, the detection unit 500 applies a voltage between the first terminal 111 of the first resistance change member 110 and the second terminal 112 of the first resistance change member 110. At that time, the detection unit 500 detects, as the first detection value, a current between the first terminal 111 of the first resistance change member 110 and the second terminal 112 of the first resistance change member 110.

With the configuration described above, generation of hydrogen sulfide can be detected with high accuracy. More specifically, since the detection is performed with use of the first resistance change member 110 that is independent of the first power generation element 210, a result of the detection is not affected by variations of a resistance value, which are attributable to, e.g., a charge-discharge state or a deterioration state of the first power generation element 210. In other words, the detection can be performed in a state free from erroneous detection attributable to the electrodes. Therefore, when hydrogen sulfide is generated inside the first case 310 and the electrical resistance of the first resistance change material is changed, such a situation can be detected with higher accuracy. Furthermore, since the detection is performed with use of the first resistance change member 110 that is independent of the first power generation element 210, it is possible to avoid degradation of the charge-discharge characteristics of the first power generation element 210 or obstruction to the charging and discharging operations thereof, the degradation and the obstruction being attributable to the operation of the detection unit 500. Thus, the generation of hydrogen sulfide can be detected with high accuracy without causing influences on the charge-discharge characteristics and the charging and discharging operations of the first power generation element 210.

Figure 4A:
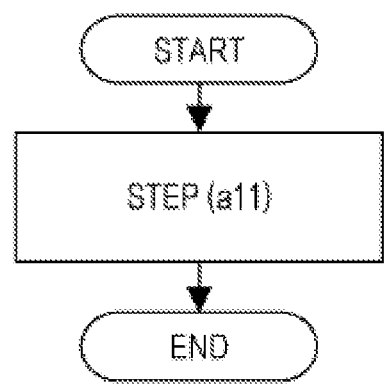
FIGS. 4A and 4B are each a flowchart illustrating a detection method according to the second embodiment.
Figure 4B:
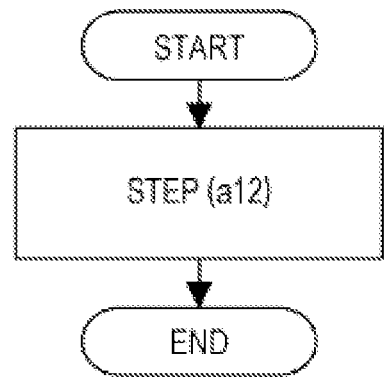

FIGS. 4A and 4B are each a flowchart illustrating a detection method according to the second embodiment.

The detection method according to the second embodiment is a detection method using the detection system 2000 according to the second embodiment. The detection method according to the second embodiment is, for example, a detection method that is executed in the detection system 2000 according to the second embodiment.

The detection method according to the second embodiment includes at least one of a step (a11) and a step (a12).

The step (a11) is a step of, by the detection unit 500, applying a current between the first terminal 111 of the first resistance change member 110 and the second terminal 112 of the first resistance change member 110, and detecting, as the first detection value, a voltage between the first terminal 111 of the first resistance change member 110 and the second terminal 112 of the first resistance change member 110.

The step (a12) is a step of, by the detection unit 500, applying a voltage between the first terminal 111 of the first resistance change member 110 and the second terminal 112 of the first resistance change member 110, and detecting, as the first detection value, a current between the first terminal 111 of the first resistance change member 110 and the second terminal 112 of the first resistance change member 110.

In the detection system 2000 according to the second embodiment, the detection unit 500 may include, for example, a current application unit (e.g., a current source) and a voltage measurement unit (e.g., a voltmeter). Alternatively, the detection unit 500 may include, for example, a voltage application unit (e.g., a voltage source) and a current measurement unit (e.g., an ammeter). The current application unit, the voltage application unit, the voltage measurement unit, and the current measurement unit may be implemented with configurations generally known in the art.

Furthermore, in the detection system 2000 according to the second embodiment, the detection unit 500 is not electrically connected to any of the first positive electrode terminal 411, the first negative electrode terminal 412, and the first power generation element 210. Thus, the detection unit 500 is not electrically connected to charge-discharge paths that are constituted by the first positive electrode terminal 411, the first negative electrode terminal 412, and the first power generation element 210. In other words, the detection unit 500 is electrically completely independent of the charge-discharge paths. It is to be noted that the charge-discharge paths may be connected to an external circuit (load) or an external power supply.

In the detection system 2000 according to the second embodiment, the detection unit 500 may detect the first detection value for a predetermined time. In other words, the detection unit 500 may detect a variation of the first detection value (e.g., a voltage response or a current response) for the predetermined time.

With the configuration described above, the first detection value corresponding to the generation of hydrogen sulfide can be detected with higher accuracy. As a result, the sensitivity in the detection of hydrogen sulfide can be further increased.

Figure 5:
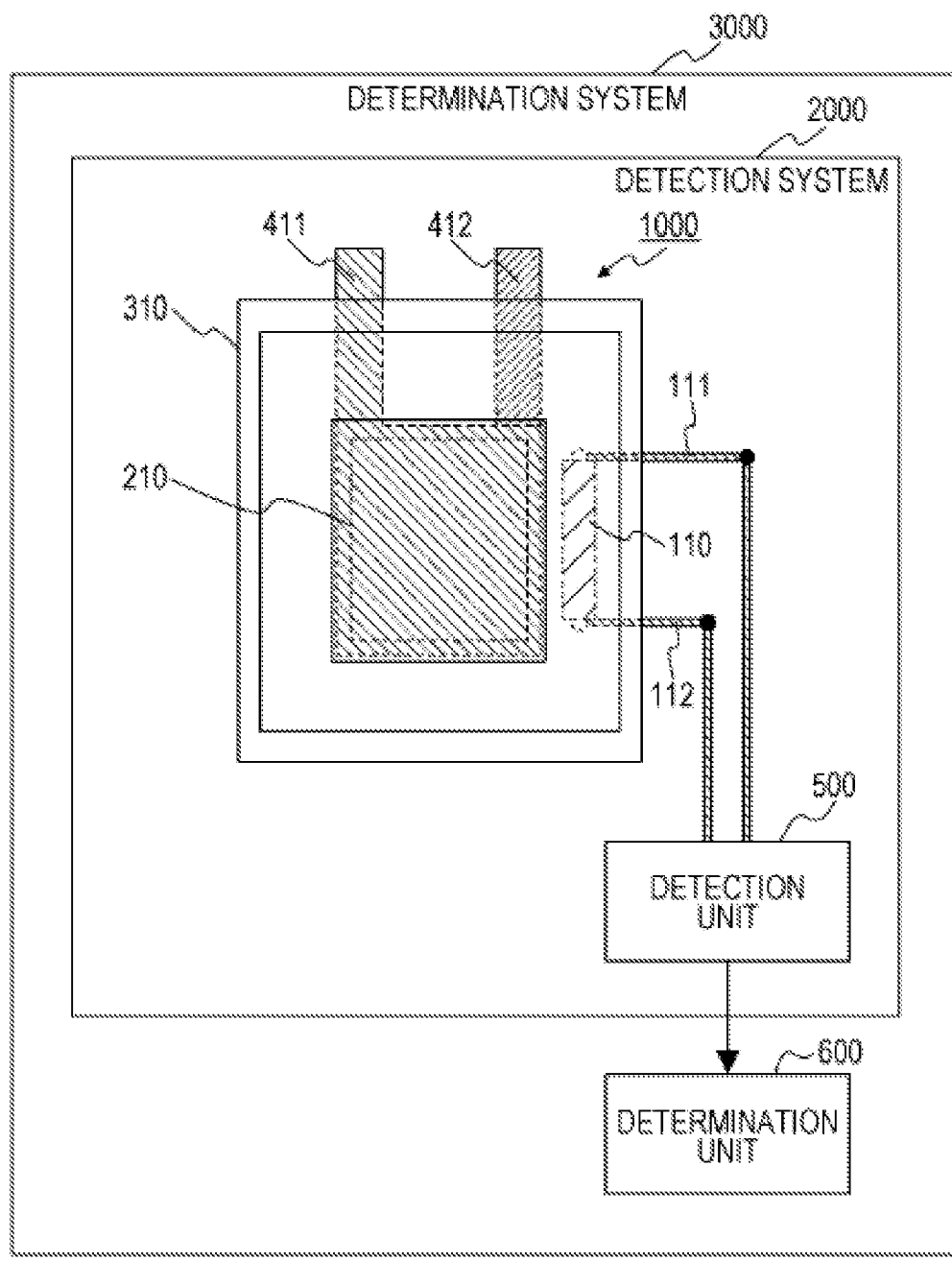
FIG. 5 schematically illustrates a configuration of a determination system according to the second embodiment.

FIG. 5 schematically illustrates a configuration of a determination system 3000 according to the second embodiment.

The determination system 3000 according to the second embodiment includes the above-described detection system 2000 according to the second embodiment, and a determination unit 600.

The determination unit 600 determines, on the basis of the first detection value, whether hydrogen sulfide is generated in the battery cell 1000. With the configuration described above, whether hydrogen sulfide is generated can be determined with high accuracy. More specifically, since the detection and the determination are performed with use of the first resistance change member 110 that is independent of the first power generation element 210, the results of the detection and the determination are not affected by variations of a resistance value, which are attributable to, e.g., a charge-discharge state or a deterioration state of the first power generation element 210. In other words, the detection and the determination can be performed in a state free from erroneous detection attributable to the electrodes. Therefore, when hydrogen sulfide is generated inside the first case 310 and the electrical resistance of the first resistance change material is changed, such a situation can be detected and determined with higher accuracy. Furthermore, since the detection and the determination are performed with use of the first resistance change member 110 that is independent of the first power generation element 210, it is possible to avoid degradation of the charge-discharge characteristics of the first power generation element 210 or obstruction to the charging and discharging operations thereof, the degradation and the obstruction being attributable to the operation of the detection unit 500. Thus, whether hydrogen sulfide is generated can be determined with high accuracy without causing influences on the charge-discharge characteristics and the charging and discharging operations of the first power generation element 210.

Figure 6:
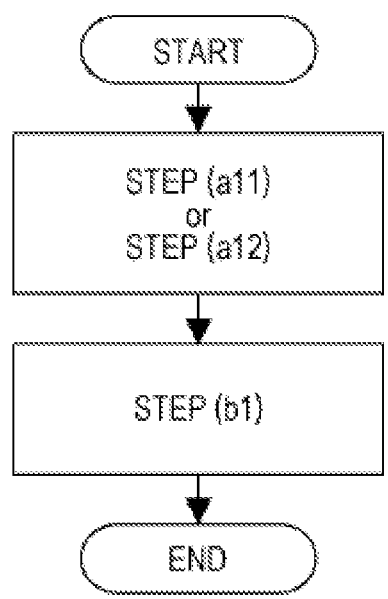
FIG. 6 is a flowchart illustrating a determination method according to the second embodiment.

FIG. 6 is a flowchart illustrating a determination method according to the second embodiment.

The determination method according to the second embodiment is a determination method using the determination system 3000 according to the second embodiment. The determination method according to the second embodiment is, for example, a determination method that is executed in the determination system 3000 according to the second embodiment.

The determination method according to the second embodiment includes the above-described detection method according to the second embodiment, and a step (b1).

The step (b1) is a step of, by the determination unit 600, determining, on the basis of the first detection value, whether hydrogen sulfide is generated in the battery cell 1000.

In the determination system 3000 according to the second embodiment, the determination unit 600 may be constituted by, e.g., an analog circuit or a digital circuit. The determination unit 600 may be constituted by, e.g., a processor and a memory. The processor may be, for example, a CPU (Central Processing Unit) or a MPU (Micro-Processing Unit). In that case, the processor may execute a control method (determination method), which is set forth in the present disclosure, by reading a program stored in the memory, and then executing the program.

Furthermore, in the determination system 3000 according to the second embodiment, the determination unit 600 may determine whether hydrogen sulfide is generated, on the basis of a variation of the first detection value (e.g., a voltage response or a current response), which has been detected for the predetermined time. The determination unit 600 may determine whether hydrogen sulfide is generated, for example, by judging whether the variation of the first detection value is normal. The determination unit 600 may determine whether hydrogen sulfide is generated, for example, by comparing the detected variation of the first detection value with information stored in the above-mentioned memory.

With the configuration described above, the variation of the first detection value, which indicates the generation of hydrogen sulfide, can be detected with higher accuracy. As a result, accuracy in determining whether hydrogen sulfide is generated can be further increased.

Third Embodiment

A third embodiment will be described below. Description overlapped with the above description of the first or second embodiment is omitted as appropriate.

Figure 7:
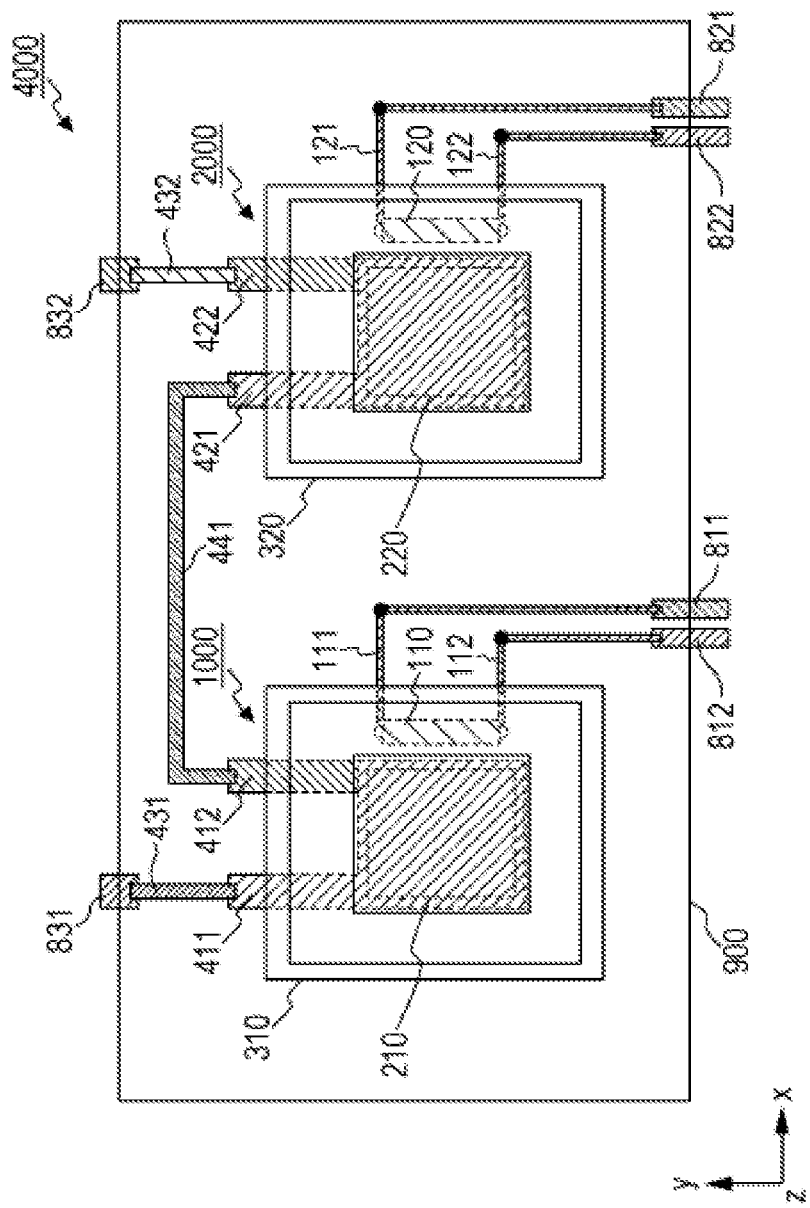
FIG. 7 schematically illustrates a configuration of a battery module according to a third embodiment.
Figure 20A:
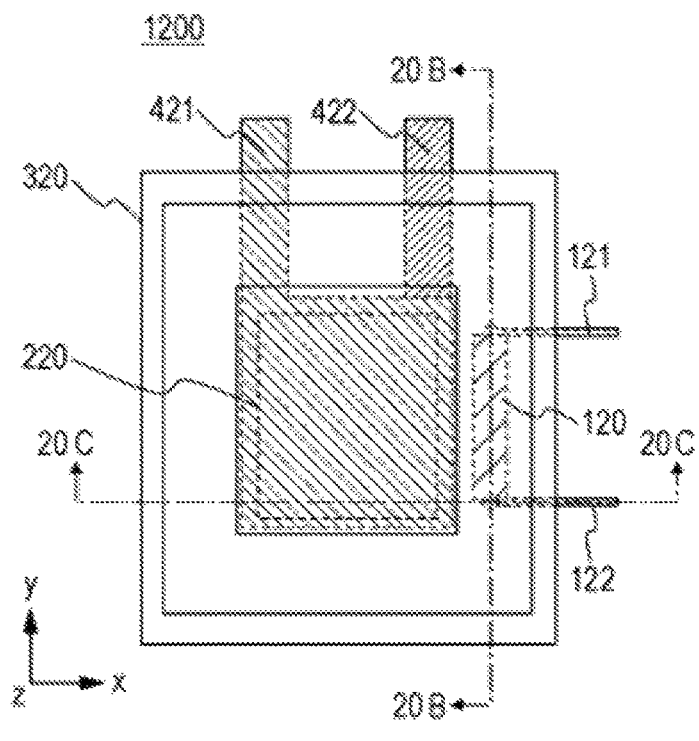
FIGS. 20A, 20B and 20C schematically illustrate a configuration of a second battery cell according to a third embodiment.
Figure 20B:
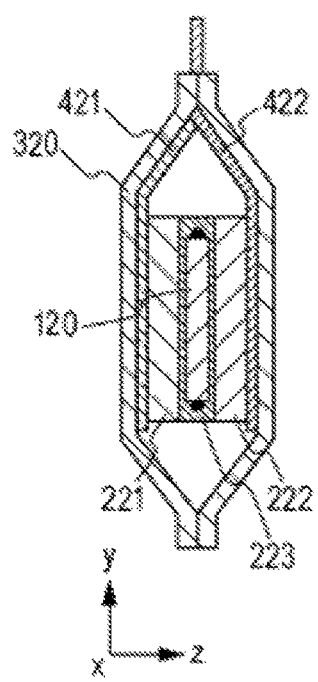
Figure 20C:
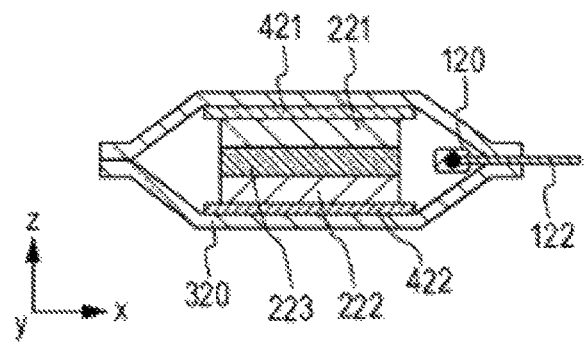

FIG. 7 schematically illustrates a configuration of a battery module 4000 according to the third embodiment. FIGS. 20A, 20B and 20C schematically illustrate a configuration of a second battery cell 1200 according to a third embodiment. FIG. 20A is an x-y view (plan view in a seeing-through way) schematically illustrating the configuration of the second battery cell 1200 according to the third embodiment. FIG. 20B is a z-y view (sectional view taken along a line 20B-20B) schematically illustrating the configuration of the second battery cell 1200 according to the third embodiment. FIG. 20C is an x-z view (sectional view taken along a line 20C-20C) schematically illustrating the configuration of the second battery cell 1200 according to the third embodiment.

The battery module 4000 according to the third embodiment includes a first battery cell 1100 and a second battery cell 1200.

The first battery cell 1100 is the same as the above-described battery cell according to the first embodiment.

The second battery cell 1200 includes a second resistance change member 120, a second power generation element 220, a second case 320, a second positive electrode terminal 421, and a second negative electrode terminal 422.

The second resistance change member 120 includes a first terminal 121 and a second terminal 122.

The second power generation element 220 includes a second positive electrode 221, a second negative electrode 222, and a second electrolyte 223.

The second electrolyte 223 is interposed between the second positive electrode 221 and the second negative electrode 222.

The second case 320 encloses (e.g., contains) the second power generation element 220 and the second resistance change member 120.

The second positive electrode terminal 421 has an end that is electrically connected to the second positive electrode 221, and an end that is exposed to the outside of the second case 320.

The second negative electrode terminal 422 has an end that is electrically connected to the second negative electrode 222, and an end that is exposed to the outside of the second case 320.

At least one of the second positive electrode 221, the second negative electrode 222, and the second electrolyte 223 contains a second sulfur-based material.

The second resistance change member 120 contains a second resistance change material of which electrical resistance is changed by a chemical reaction with hydrogen sulfide.

The first terminal 121 of the second resistance change member 120 and the second terminal 122 of the second resistance change member 120 are both exposed to the outside of the second case 320.

The second resistance change member 120 is not electrically connected to any of the second positive electrode terminal 421 and the second negative electrode terminal 422.

Any one of the first positive electrode terminal 411 and the first negative electrode terminal 412 is electrically connected to any one of the second positive electrode terminal 421 and the second negative electrode terminal 422.

With the configuration described above, since the first resistance change member 110 and the second resistance change member 120 are disposed respectively in the first battery cell 1100 and the second battery cell 1200, detection of hydrogen sulfide can be performed for each of the battery cells. In other words, the battery cells in which hydrogen sulfide has generated can be individually found in units of one cell. Therefore, the battery cells in which hydrogen sulfide has generated can be individually replaced in units of one cell, for example. Thus, a battery module can be realized in which it is not required to replace the battery cells in an excessive number (e.g., a set of battery cells including normal battery cells as well, or the entirety of the battery module). As a result, maintenance of the battery module constituted by the plurality of battery cells can be performed in an efficient and simple manner.

In the third embodiment, individual components of the first battery cell 1100 and the second battery cell 1200 may be constituted by employing the corresponding components of the above-described battery cell 1000 according to the first embodiment as appropriate.

Furthermore, in the third embodiment, the second battery cell 1200 may have the same configuration as that of the first battery cell 1100.

Alternatively, the components of the second battery cell 1200 may be partly different from the components of the first battery cell 1100.

The battery module 4000 according to the third embodiment may further include, as illustrated in FIG. 7, a module positive electrode terminal 831, a module positive electrode lead 431, a module negative electrode terminal 832, a module negative electrode lead 432, a first inter-electrode connecting lead 441, a first detection terminal 811, a second detection terminal 812, a third detection terminal 821, a fourth detection terminal 822, and an outer casing 900.

The module positive electrode terminal 831 and the first positive electrode terminal 411 are connected to each other through the module positive electrode lead 431.

The module negative electrode terminal 832 and the second negative electrode terminal 422 are connected to each other through the module negative electrode lead 432.

The first negative electrode terminal 412 and the second positive electrode terminal 421 are connected to each other through the first inter-electrode connecting lead 441. Thus, the first negative electrode terminal 412 is electrically connected to the second positive electrode terminal 421.

With the configuration described above, the first power generation element 210 and the second power generation element 220 are connected to each other in series. As a result, a high-voltage module can be constituted.

In the battery module 4000 according to the third embodiment, the module positive electrode terminal 831 and the second positive electrode terminal 421 may be connected to each other through the module positive electrode lead 431. In that case, the module negative electrode terminal 832 and the first negative electrode terminal 412 may be connected to each other through the module negative electrode lead 432. In addition, the first positive electrode terminal 411 and the second negative electrode terminal 422 may be connected to each other through the first inter-electrode connecting lead 441.

Thus, the first positive electrode terminal 411 may be electrically connected to the second negative electrode terminal 422.

The first detection terminal 811 is electrically connected to the first terminal 111 of the first resistance change member 110.

The second detection terminal 812 is electrically connected to the second terminal 112 of the first resistance change member 110.

The third detection terminal 821 is electrically connected to the first terminal 121 of the second resistance change member 120.

The fourth detection terminal 822 is electrically connected to the second terminal 122 of the second resistance change member 120.

The outer casing 900 encloses (e.g., contains) the first battery cell 1100, the second battery cell 1200, the module positive electrode lead 431, the module negative electrode lead 432, and the first inter-electrode connecting lead 441.

The outer casing 900 may be constituted by optionally utilizing materials and configurations of outer casings of generally known battery cells. The outer casing 900 may be in the form of, e.g., a box or a housing. In such a case, the box or the housing may be formed of, e.g., metal or resin.

Respective one ends of the module positive electrode terminal 831, the module negative electrode terminal 832, the first detection terminal 811, the second detection terminal 812, the third detection terminal 821, and the fourth detection terminal 822 may be exposed to the inner side of the outer casing 900, and respective other ends of those terminals may be exposed to the outer side of the outer casing 900.

In the battery module 4000 according to the third embodiment, the first resistance change member 110 and the second resistance change member 120 are not electrically connected to any of the module positive electrode terminal 831, the module positive electrode lead 431, the module negative electrode terminal 832, the module negative electrode lead 432, and the first inter-electrode connecting lead 441. Thus, the first resistance change member 110 and the second resistance change member 120 are not electrically connected to charge-discharge paths that are constituted by the module positive electrode terminal 831, the module positive electrode lead 431, the module negative electrode terminal 832, the module negative electrode lead 432, and the first inter-electrode connecting lead 441. In other words, the first resistance change member 110 and the second resistance change member 120 are electrically completely independent of the charge-discharge paths.

In the battery module 4000 according to the third embodiment, as illustrated in FIG. 7, the first detection terminal 811, the second detection terminal 812, the third detection terminal 821, and the fourth detection terminal 822 may be exposed (for example, led out) from the same one of lateral surfaces of the outer casing 900.

Alternatively, the first detection terminal 811, the second detection terminal 812, the third detection terminal 821, and the fourth detection terminal 822 may be exposed (for example, led out) from different ones of the lateral surfaces of the outer casing 900.

In the battery module 4000 according to the third embodiment, as illustrated in FIG. 7, the first detection terminal 811, the second detection terminal 812, the third detection terminal 821, and the fourth detection terminal 822 may be exposed (for example, led out) from one of the lateral surfaces of the outer casing 900, the one being different from the other lateral surface where the module positive electrode terminal 831 or the module negative electrode terminal 832 is exposed.

Alternatively, the first detection terminal 811, the second detection terminal 812, the third detection terminal 821, and the fourth detection terminal 822 may be exposed (for example, led out) from the same one of the lateral surfaces of the outer casing 900 as the lateral surface where the module positive electrode terminal 831 or the module negative electrode terminal 832 is exposed.

In the battery module 4000 according to the third embodiment, as illustrated in FIG. 7, the first battery cell 1100 and the second battery cell 1200 may be arranged in a state not overlapping with each other.

Alternatively, the first battery cell 1100 and the second battery cell 1200 may be arranged in a state overlapping with each other.

The battery module 4000 according to the third embodiment may further include another battery cell in addition to the first battery cell 1100 and the second battery cell 1200. In other words, the battery module 4000 according to the third embodiment may include three or more battery cells.

Figure 8:
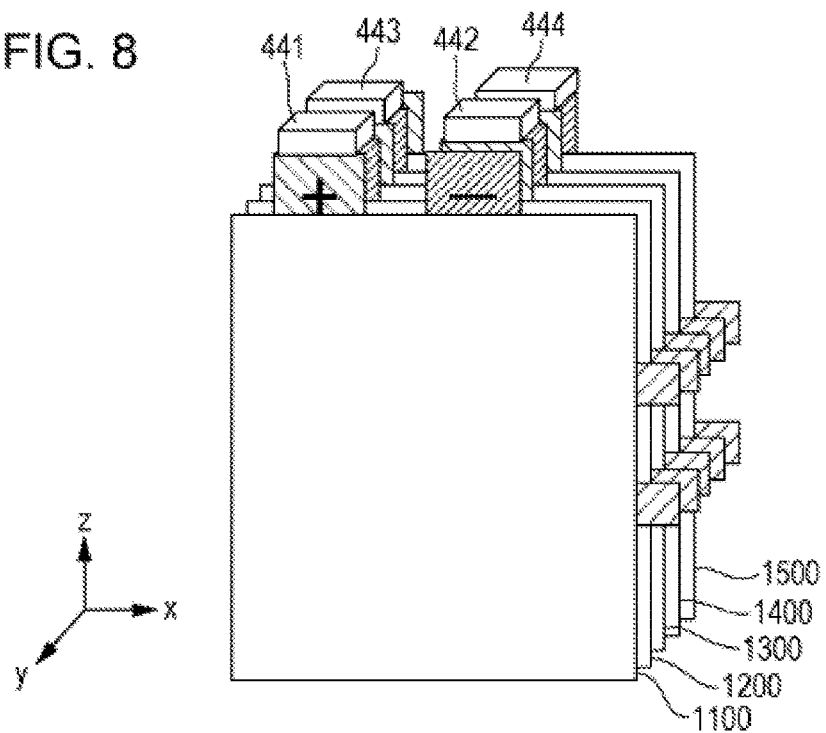
FIG. 8 is a perspective view schematically illustrating one modification of the battery module according to the third embodiment.

FIG. 8 is a perspective view schematically illustrating one modification of the battery module 4000 according to the third embodiment.

The modification illustrated in FIG. 8 includes a first battery cell 1100, a second battery cell 1200, a third battery cell 1300, a fourth battery cell 1400, a fifth battery cell 1500, a first inter-electrode connecting lead 441, a second inter-electrode connecting lead 442, a third inter-electrode connecting lead 443, and a fourth inter-electrode connecting lead 444.

The first battery cell 1100, the second battery cell 1200, the third battery cell 1300, the fourth battery cell 1400, and the fifth battery cell 1500 are arranged (for example, contained in the outer casing 900) in an overlapped (multilayered) state. Accordingly, the size of the battery module is reduced.

The first inter-electrode connecting lead 441 connects a positive electrode terminal of the first battery cell 1100 and a negative electrode terminal of the second battery cell 1200.

The second inter-electrode connecting lead 442 connects a positive electrode terminal of the second battery cell 1200 and a negative electrode terminal of the third battery cell 1300.

The third inter-electrode connecting lead 443 connects a positive electrode terminal of the third battery cell 1300 and a negative electrode terminal of the fourth battery cell 1400.

The fourth inter-electrode connecting lead 444 connects a positive electrode terminal of the fourth battery cell 1400 and a negative electrode terminal of the fifth battery cell 1500.

With the configuration described above, the first battery cell 1100, the second battery cell 1200, the third battery cell 1300, the fourth battery cell 1400, the fifth battery cell 1500 are connected in series. As a result, a high-voltage module can be constituted.

Furthermore, the resistance change member of each of the battery cells is not electrically connected to the positive electrode terminal and the negative electrode terminal of the relevant battery cell. As a result, the detection of hydrogen sulfide can be performed with higher accuracy.

Figure 9:
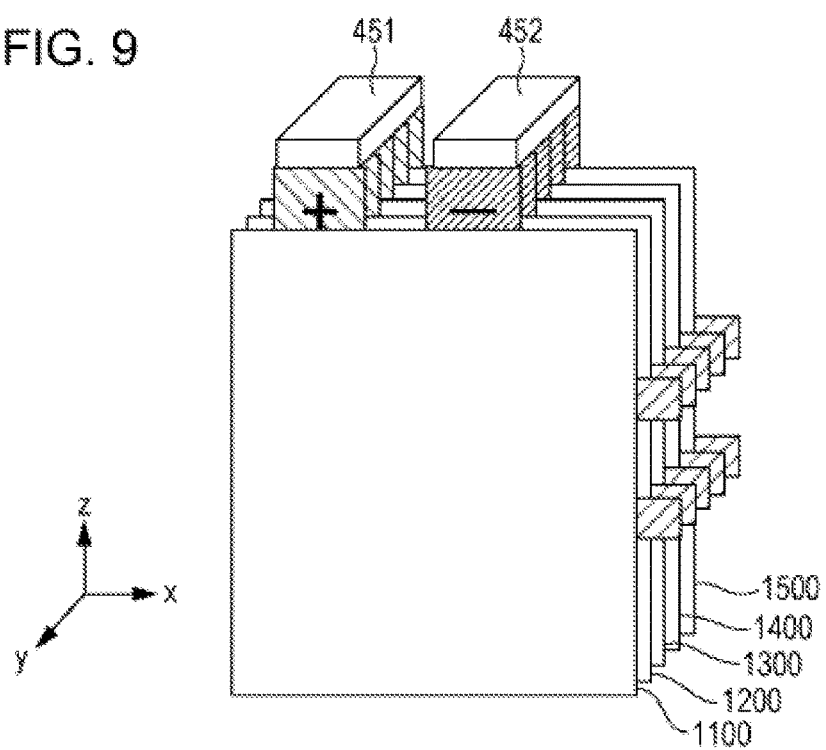
FIG. 9 is a perspective view schematically illustrating another modification of the battery module according to the third embodiment.

FIG. 9 is a perspective view schematically illustrating another modification of the battery module 4000 according to the third embodiment.

The modification illustrated in FIG. 9 includes the first battery cell 1100, the second battery cell 1200, the third battery cell 1300, the fourth battery cell 1400, the fifth battery cell 1500, an inter-positive-electrode parallel connecting lead 451, and an inter-negative-electrode parallel connecting lead 452.

The first battery cell 1100, the second battery cell 1200, the third battery cell 1300, the fourth battery cell 1400, and the fifth battery cell 1500 are arranged (for example, contained in the outer casing 900) in an overlapped (multilayered) state. Accordingly, the size of the battery module is reduced.

The inter-positive-electrode parallel connecting lead 451 connects the respective positive electrode terminals of the battery cells to one another.

The inter-negative-electrode parallel connecting lead 452 connects the respective negative electrode terminals of the battery cells to one another.

With the configuration described above, the first battery cell 1100, the second battery cell 1200, the third battery cell 1300, the fourth battery cell 1400, the fifth battery cell 1500 are connected in parallel. As a result, a large-capacity module can be constituted.

Furthermore, the resistance change member of each of the battery cells is not electrically connected to the positive electrode terminal and the negative electrode terminal of the relevant battery cell. As a result, the detection of hydrogen sulfide can be performed with higher accuracy.

In the third embodiment, at least one of the module positive electrode lead 431, the module negative electrode lead 432, the first inter-electrode connecting lead 441, the second inter-electrode connecting lead 442, the third inter-electrode connecting lead 443, the fourth inter-electrode connecting lead 444, the inter-positive-electrode parallel connecting lead 451, and the inter-negative-electrode parallel connecting lead 452 may be a lead wire, a busbar, or the like, which is made of, e.g., a conductive material (e.g., a metal material).

Fourth Embodiment

A fourth embodiment will be described below. Description overlapped with the above description of the first embodiment, the second embodiment, or the third embodiment is omitted as appropriate.

Figure 10:
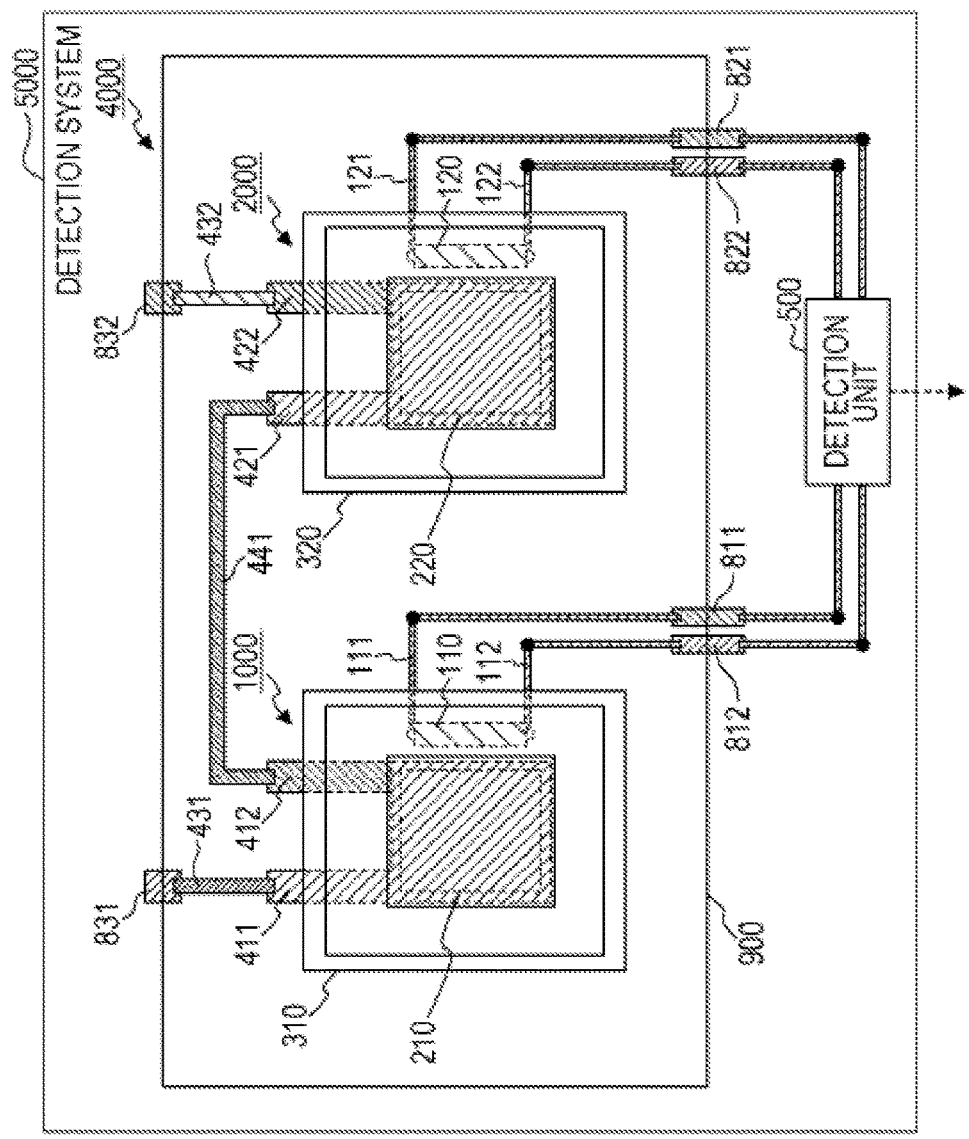
FIG. 10 schematically illustrates a configuration of one detection system according to a fourth embodiment.

FIG. 10 schematically illustrates a configuration of one detection system 5000 according to the fourth embodiment.

The detection system 5000 according to the fourth embodiment includes the above-described battery module 4000 according to the third embodiment, and the detection unit 500.

The detection unit 500 applies a current between the first terminal 111 of the first resistance change member 110 and the second terminal 112 of the first resistance change member 110. At that time, the detection unit 500 detects, as the first detection value, a voltage between the first terminal 111 of the first resistance change member 110 and the second terminal 112 of the first resistance change member 110.

Alternatively, the detection unit 500 applies a voltage between the first terminal 111 of the first resistance change member 110 and the second terminal 112 of the first resistance change member 110. At that time, the detection unit 500 detects, as the first detection value, a current between the first terminal 111 of the first resistance change member 110 and the second terminal 112 of the first resistance change member 110.

The detection unit 500 applies a current between the first terminal 121 of the second resistance change member 120 and the second terminal 122 of the second resistance change member 120. At that time, the detection unit 500 detects, as a second detection value, a voltage between the first terminal 121 of the second resistance change member 120 and the second terminal 122 of the second resistance change member 120.

Alternatively, the detection unit 500 applies a voltage between the first terminal 121 of the second resistance change member 120 and the second terminal 122 of the second resistance change member 120. At that time, the detection unit 500 detects, as the second detection value, a current between the first terminal 121 of the second resistance change member 120 and the second terminal 122 of the second resistance change member 120.

With the configuration described above, the generation of hydrogen sulfide can be detected with higher accuracy. More specifically, since the detection is performed with use of the first resistance change member 110 and the second resistance change member 120 that are independent of the first power generation element 210 and the second power generation element 220, respectively, a result of the detection is not affected by variations of a resistance value, which are attributable to, e.g., a charge-discharge state or a deterioration state of the first power generation element 210 or the second power generation element 220. In other words, the detection can be performed in a state free from erroneous detection attributable to the electrodes. Therefore, when hydrogen sulfide is generated inside the first case 310 or the second case 320 and the electrical resistance of the first resistance change member 110 or the second resistance change member 120 is changed, such a situation can be detected with higher accuracy. Furthermore, since the detection is performed with use of the first resistance change member 110 and the second resistance change member 120 that are independent of the first power generation element 210 and the second power generation element 220, respectively, it is possible to avoid degradation of the charge-discharge characteristics of the first power generation element 210 and the second power generation element 220 or obstruction to the charging and discharging operations thereof, the degradation and the obstruction being attributable to the operation of the detection unit 500. Thus, the generation of hydrogen sulfide can be detected with high accuracy without causing influences on the charge-discharge characteristics and the charging and discharging operations of the first power generation element 210 and the second power generation element 220. As a result, the generation of hydrogen sulfide for each of the battery cells can be detected with higher accuracy.

Figure 11:
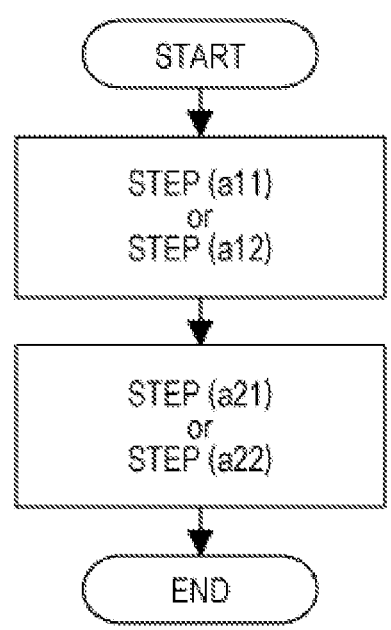
FIG. 11 is a flowchart illustrating a detection method according to the fourth embodiment.

FIG. 11 is a flowchart illustrating a detection method according to the fourth embodiment.

The detection method according to the fourth embodiment is a detection method using the detection system 5000 according to the fourth embodiment. The detection method according to the fourth embodiment is, for example, a detection method that is executed in the detection system 5000 according to the fourth embodiment.

The detection method according to the fourth embodiment includes at least one of a step (a11) and a step (a12), and at least one of a step (a21) and a step (a22).

The step (a11) is a step of, by the detection unit 500, applying a current between the first terminal 111 of the first resistance change member 110 and the second terminal 112 of the first resistance change member 110, and detecting, as the first detection value, a voltage between the first terminal 111 of the first resistance change member 110 and the second terminal 112 of the first resistance change member 110.

The step (a12) is a step of, by the detection unit 500, applying a voltage between the first terminal 111 of the first resistance change member 110 and the second terminal 112 of the first resistance change member 110, and detecting, as the first detection value, a current between the first terminal 111 of the first resistance change member 110 and the second terminal 112 of the first resistance change member 110.

The step (a21) is a step of, by the detection unit 500, applying a current between the first terminal 121 of the second resistance change member 120 and the second terminal 122 of the second resistance change member 120, and detecting, as the second detection value, a voltage between the first terminal 121 of the second resistance change member 120 and the second terminal 122 of the second resistance change member 120.

The step (a22) is a step of, by the detection unit 500, applying a voltage between the first terminal 121 of the second resistance change member 120 and the second terminal 122 of the second resistance change member 120, and detecting, as the second detection value, a current between the first terminal 121 of the second resistance change member 120 and the second terminal 122 of the second resistance change member 120.

Figure 12:
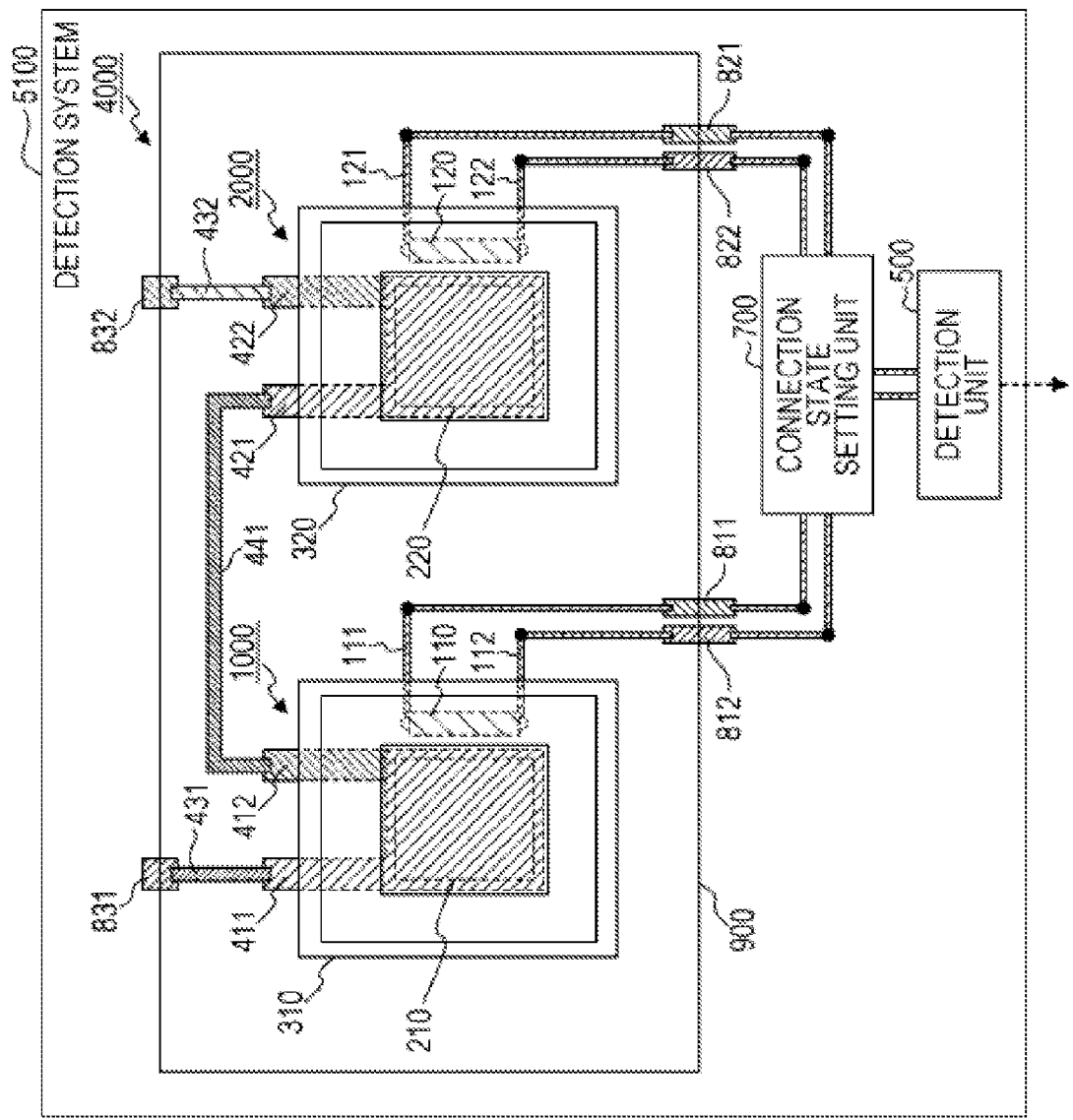
FIG. 12 schematically illustrates a configuration of another detection system according to the fourth embodiment.

FIG. 12 schematically illustrates a configuration of another detection system 5100 according to the fourth embodiment.

The detection system 5100 according to the fourth embodiment includes the following configuration in addition to the above-described configuration of the detection system 5000.

In other words, the detection system 5100 according to the fourth embodiment further includes a connection state setting unit 700.

The connection state setting unit 700 sets a connection state between the detection unit 500 and each of the first battery cell 1100 and the second battery cell 1200.

The connection state setting unit 700 sets the connection state to a first connection state in which the detection unit 500 is connected to the first battery cell 1100, and in which the detection unit 500 is not connected to the second battery cell 1200.

In the first connection state, the detection unit 500 detects the first detection value.

The connection state setting unit 700 sets the connection state to a second connection state in which the detection unit 500 is not connected to the first battery cell 1100, and in which the detection unit 500 is connected to the second battery cell 1200.

In the second connection state, the detection unit 500 detects the second detection value.

With the configuration described above, the generation of hydrogen sulfide in each of the first battery cell 1100 and the second battery cell 1200 can be detected even with the single detection unit 500. As a result, the detection system can be simplified in configuration and reduced in size.

Figure 13:
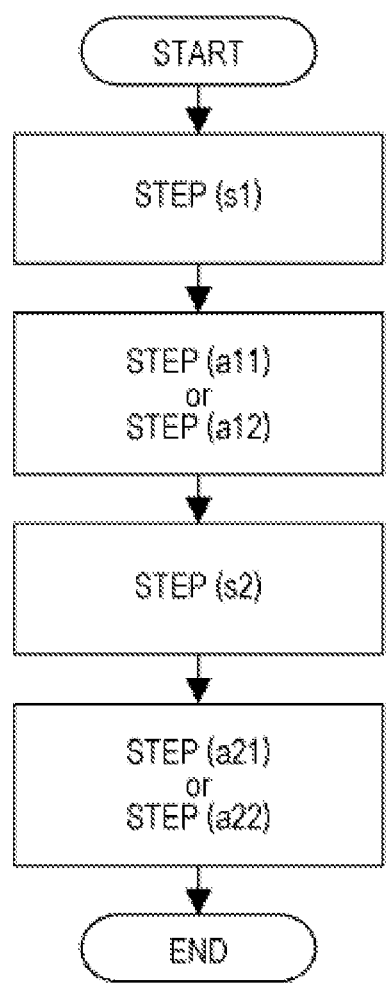
FIG. 13 is a flowchart illustrating a modification of the detection method according to the fourth embodiment.

FIG. 13 is a flowchart illustrating a modification of the detection method according to the fourth embodiment.

The detection method according to the modification illustrated in FIG. 13 is a detection method using the detection system 5100 according to the fourth embodiment. The detection method according to the modification illustrated in FIG. 13 is, for example, a detection method that is executed in the detection system 5100 according to the fourth embodiment.

The detection method according to the modification illustrated in FIG. 13 includes a step (s1), at least one of the step (a11) and the step (a12), a step (s2), and at least one of the step (a21) and the step (a22).

The step (s1) is a step of, by the connection state setting unit 700, setting the above-described connection state to the first connection state in which the detection unit 500 is connected to the first battery cell 1100, and in which the detection unit 500 is not connected to the second battery cell 1200.

The step (s2) is a step of, by the connection state setting unit 700, setting the above-described connection state to the second connection state in which the detection unit 500 is not connected to the first battery cell 1100, and in which the detection unit 500 is connected to the second battery cell 1200.

The step (a11) and the step (a12) are executed after the step (s1).

The step (a21) and the step (a22) are executed after the step (s2).

In the detection system 5100 according to the fourth embodiment, the connection state setting unit 700 may be, for example, a switch circuit that is constituted by a switching element. The connection state may be set by a switching operation of the switching element, which changes over a conducted state of connection wiring. In that case, the switching operation of the switching element may be controlled by the determination unit 600. As an alternative, the detection system 5100 according to the fourth embodiment may separately include a control unit to control the switching operation of the switching element.

Figure 14:
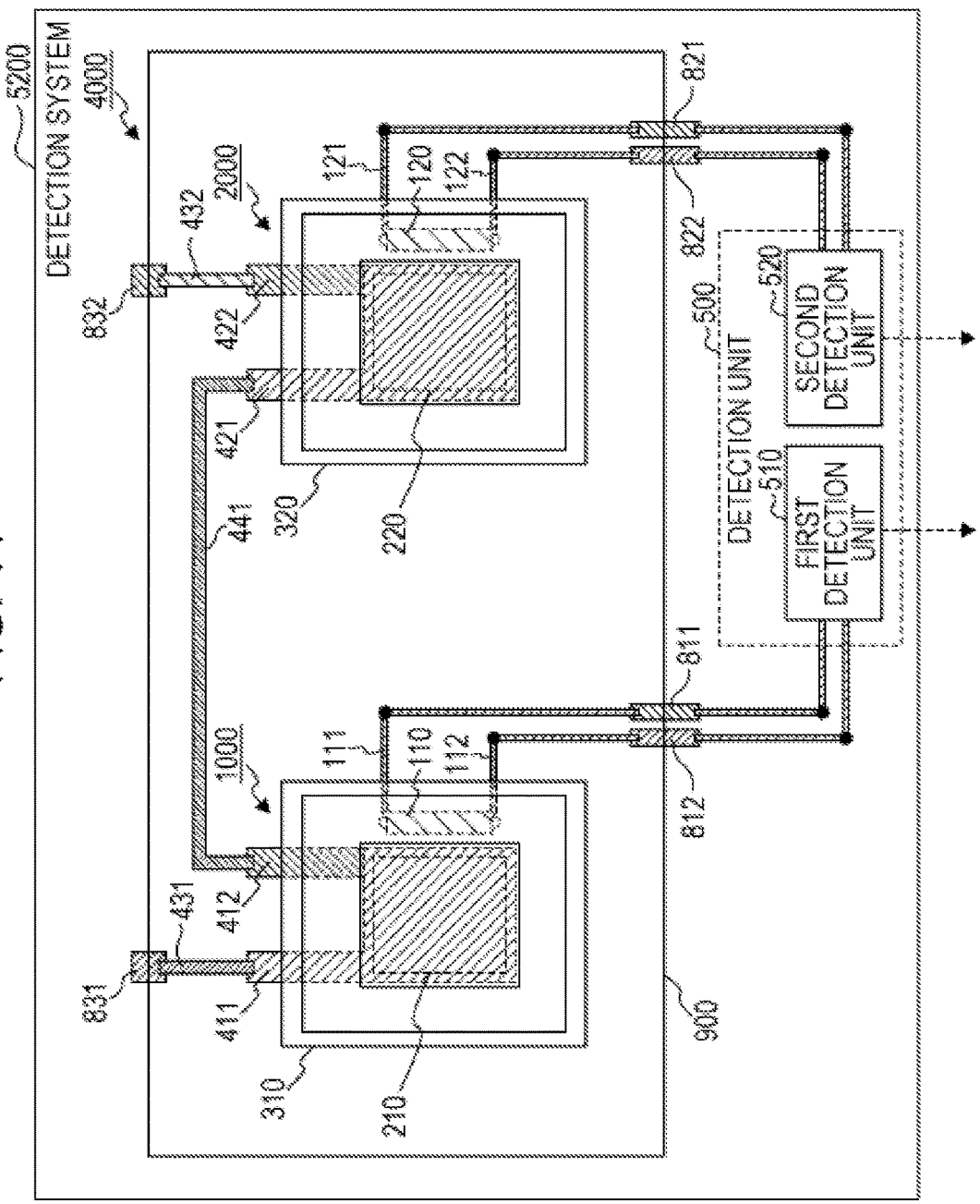
FIG. 14 schematically illustrates a configuration of still another detection system according to the fourth embodiment.

FIG. 14 schematically illustrates a configuration of still another detection system 5200 according to the fourth embodiment.

The detection system 5200 according to the fourth embodiment includes the following configuration in addition to the above-described configuration of the detection system 5000.

In other words, in the detection system 5200 according to the fourth embodiment, the detection unit 500 includes a first detection unit 510 and a second detection unit 520.

The first detection unit 510 applies a current between the first terminal 111 of the first resistance change member 110 and the second terminal 112 of the first resistance change member 110. At that time, the first detection unit 510 detects, as the first detection value, a voltage between the first terminal 111 of the first resistance change member 110 and the second terminal 112 of the first resistance change member 110.

Alternatively, the first detection unit 510 applies a voltage between the first terminal 111 of the first resistance change member 110 and the second terminal 112 of the first resistance change member 110. At that time, the first detection unit 510 detects, as the first detection value, a current between the first terminal 111 of the first resistance change member 110 and the second terminal 112 of the first resistance change member 110.

The second detection unit 520 applies a current between the first terminal 121 of the second resistance change member 120 and the second terminal 122 of the second resistance change member 120. At that time, the second detection unit 520 detects, as the second detection value, a voltage between the first terminal 121 of the second resistance change member 120 and the second terminal 122 of the second resistance change member 120.

Alternatively, the second detection unit 520 applies a voltage between the first terminal 121 of the second resistance change member 120 and the second terminal 122 of the second resistance change member 120. At that time, the second detection unit 520 detects, as the second detection value, a current between the first terminal 121 of the second resistance change member 120 and the second terminal 122 of the second resistance change member 120.

With the configuration described above, the detection unit 500 can be constituted by employing the first detection unit 510 and the second detection unit 520, which are more suitable for configurations (such as sizes, materials used, etc.) of the first battery cell 1100 and the second battery cell 1200, respectively. As a result, whether hydrogen sulfide is generated can be determined for each of the battery cells with higher accuracy. Furthermore, because of including the plurality of detection units, it is possible, for example, to simultaneously determine, in both the first battery cell 1100 and the second battery cell 1200, whether hydrogen sulfide is generated.

In the detection method using the detection system 5200 according to the fourth embodiment, the step (a11) and the step (a12) are executed by the first detection unit 510. The step (a21) and the step (a22) are executed by the second detection unit 520.

In the fourth embodiment, the detection unit 500 (or the first detection unit 510) may be electrically connected to the first detection terminal 811 and the second detection terminal 812. Alternatively, the detection unit 500 (or the first detection unit 510) may be directly connected to the first terminal 111 and the second terminal 112 of the first resistance change member 110.

Furthermore, in the fourth embodiment, the detection unit 500 (or the second detection unit 520) may be electrically connected to the third detection terminal 821 and the fourth detection terminal 822. Alternatively, the detection unit 500 (or the second detection unit 520) may be directly connected to the first terminal 121 and the second terminal 122 of the second resistance change member 120.

In the fourth embodiment, each of the detection unit 500, the first detection unit 510, and the second detection unit 520 may include, for example, a current application unit (e.g., a current source) and a voltage measurement unit (e.g., a voltmeter). Alternatively, each of the detection unit 500, the first detection unit 510, and the second detection unit 520 may include, for example, a voltage application unit (e.g., a voltage source) and a current measurement unit (e.g., an ammeter). The current application unit, the voltage application unit, the voltage measurement unit, and the current measurement unit may be implemented with configurations generally known in the art.

In the fourth embodiment, the detection unit 500 is not electrically connected to any of the module positive electrode terminal 831, the module positive electrode lead 431, the module negative electrode terminal 832, the module negative electrode lead 432, and the first inter-electrode connecting lead 441. Thus, the detection unit 500 is not electrically connected to charge-discharge paths that are constituted by the module positive electrode terminal 831, the module positive electrode lead 431, the module negative electrode terminal 832, the module negative electrode lead 432, and the first inter-electrode connecting lead 441. In other words, the detection unit 500 is electrically completely independent of the charge-discharge paths. It is to be noted that the charge-discharge paths may be connected to an external circuit (load) or an external power supply.

In the fourth embodiment, the detection unit 500 (or the first detection unit 510) may detect the first detection value for a predetermined time. In other words, the detection unit 500 (or the first detection unit 510) may detect a variation of the first detection value (e.g., a voltage response or a current response) for the predetermined time. Moreover, the detection unit 500 (or the second detection unit 520) may detect the second detection value for a predetermined time. In other words, the detection unit 500 (or the second detection unit 520) may detect a variation of the second detection value (e.g., a voltage response or a current response) for the predetermined time.

With the configuration described above, the first detection value and the second detection value corresponding to the generation of hydrogen sulfide can be detected with higher accuracy. As a result, the sensitivity in the detection of hydrogen sulfide can be further increased.

Figure 15:
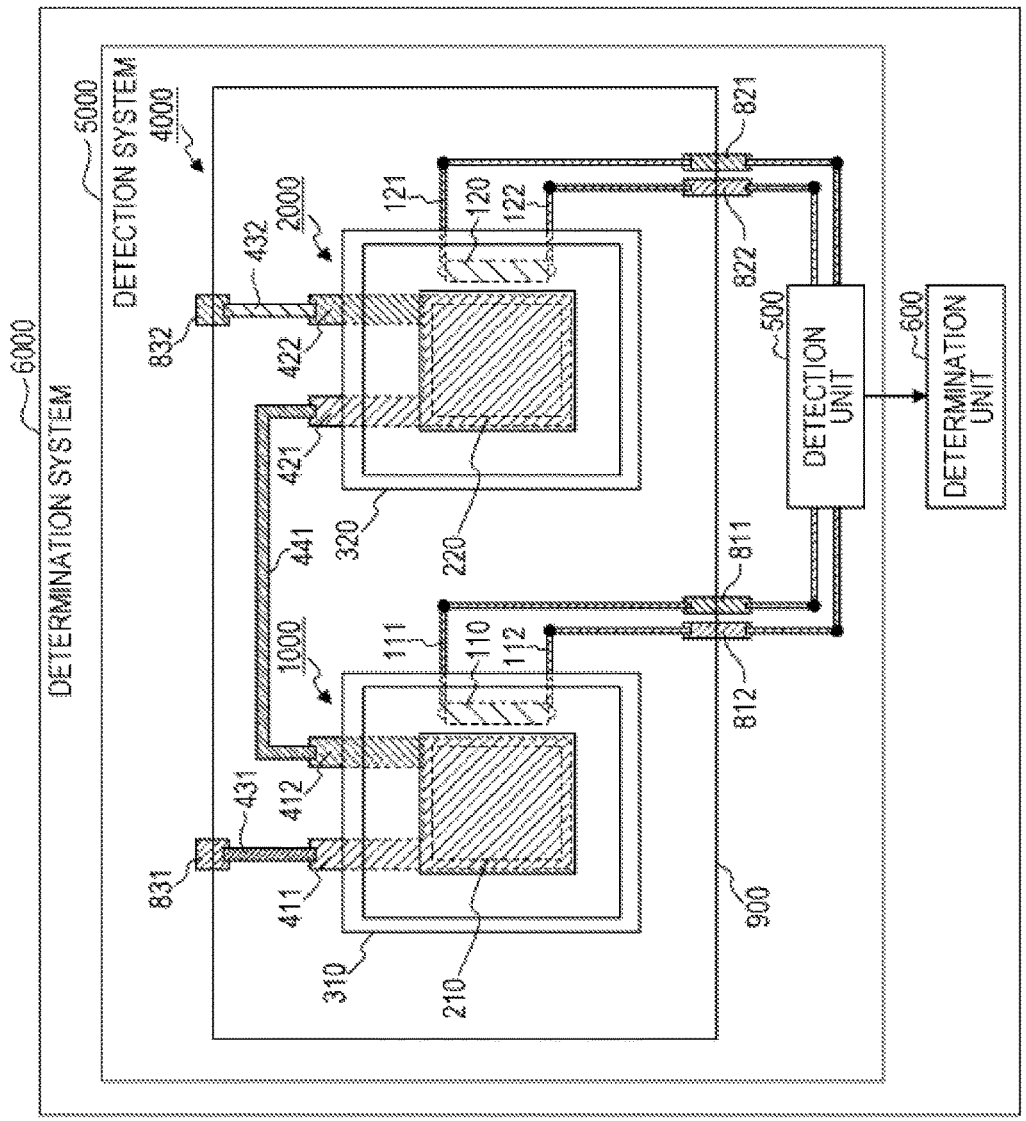
FIG. 15 schematically illustrates a configuration of a determination system according to the fourth embodiment.

FIG. 15 schematically illustrates a configuration of a determination system 6000 according to the fourth embodiment.

The determination system 6000 according to the fourth embodiment includes the above-described detection system 5000 according to the fourth embodiment, and the determination unit 600.

Figure 16:
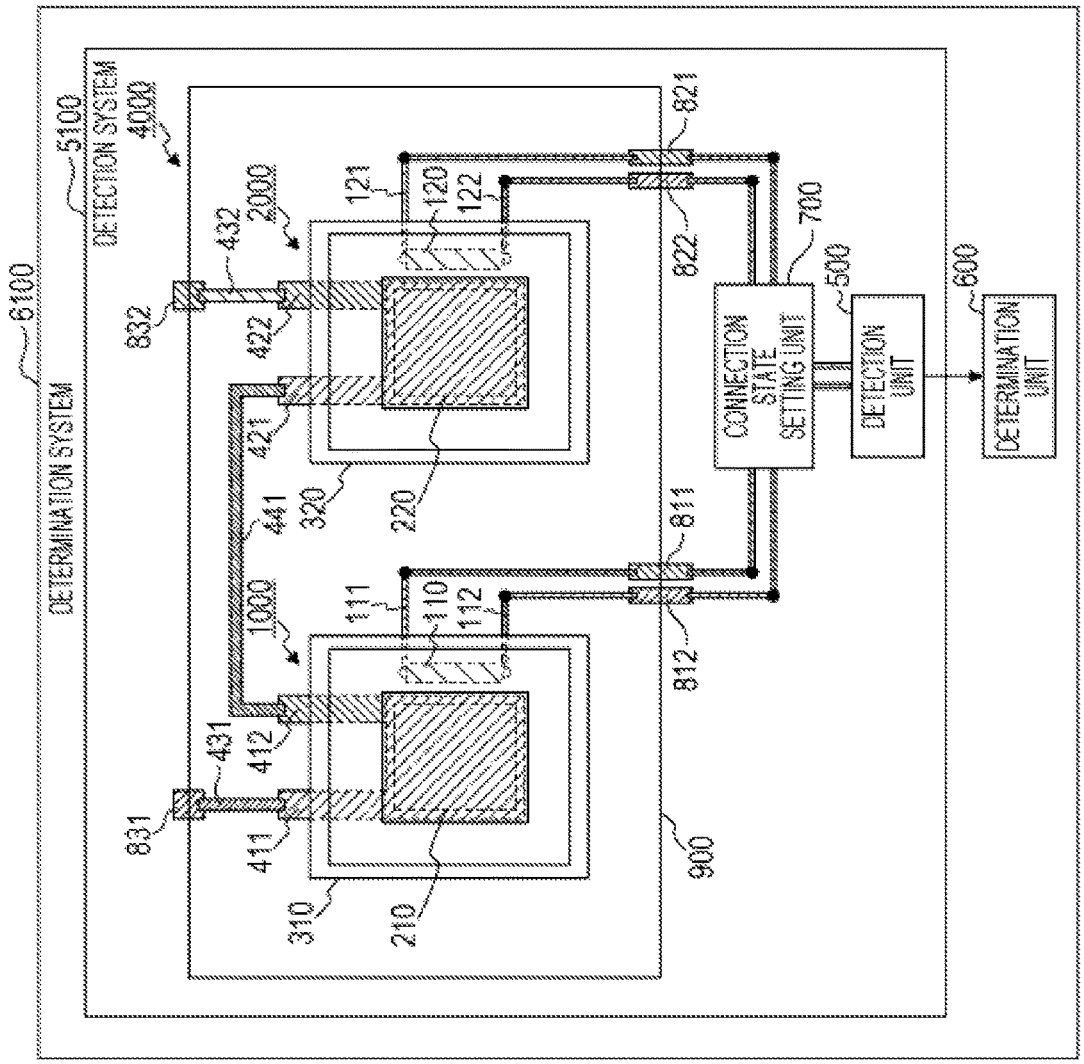
FIG. 16 schematically illustrates a configuration of another determination system according to the fourth embodiment.

FIG. 16 schematically illustrates a configuration of another determination system 6100 according to the fourth embodiment.

The determination system 6100 according to the fourth embodiment includes the above-described detection system 5100 according to the fourth embodiment, and the determination unit 600.

Figure 17:
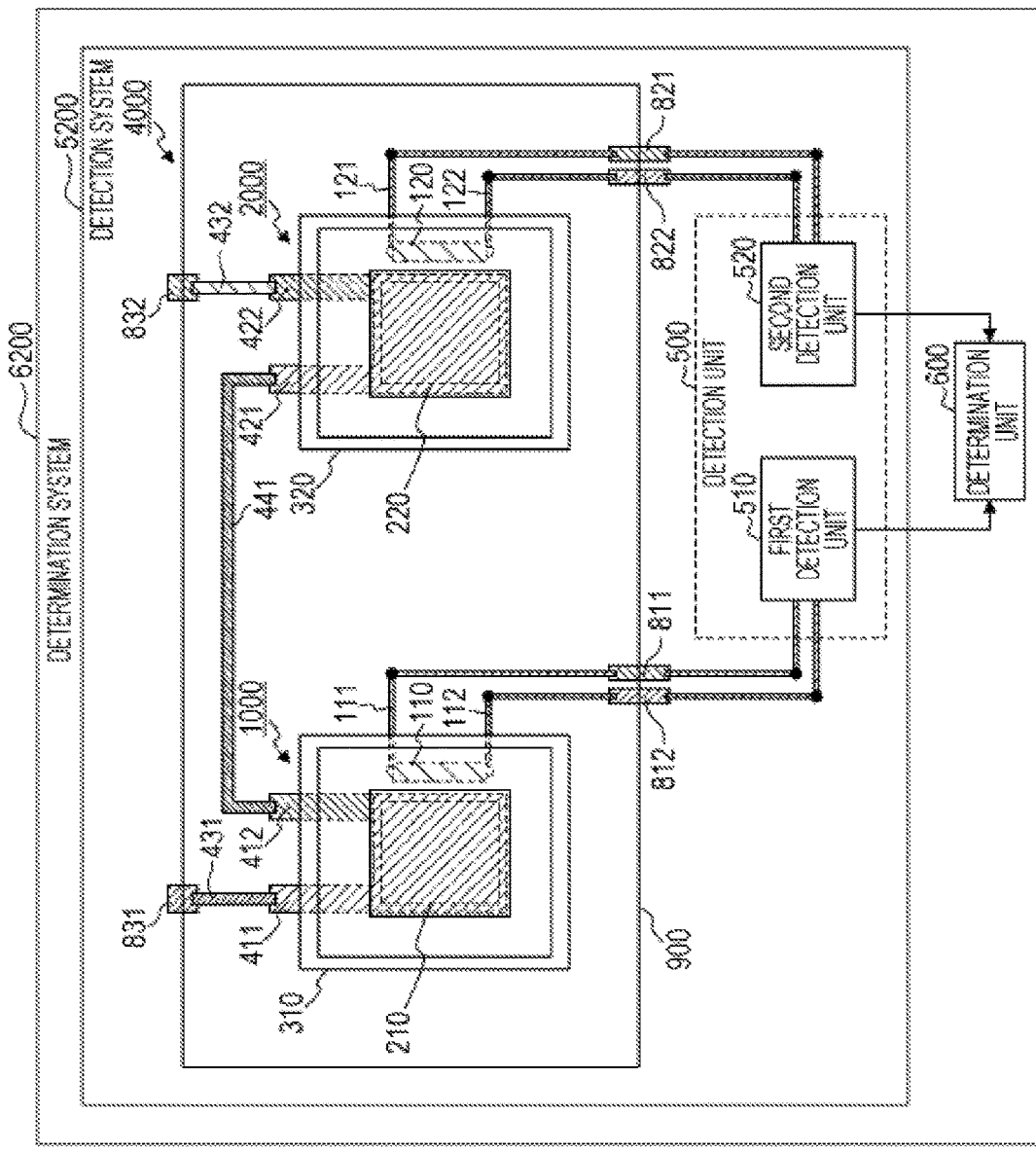
FIG. 17 schematically illustrates a configuration of still another determination system according to the fourth embodiment.

FIG. 17 schematically illustrates a configuration of still another determination system 6200 according to the fourth embodiment.

The determination system 6200 according to the fourth embodiment includes the above-described detection system 5200 according to the fourth embodiment, and the determination unit 600.

In each of the determination system 6000, the determination system 6100, and the determination system 6200 according to the fourth embodiment, the determination unit 600 determines, on the basis of the first detection value, whether hydrogen sulfide is generated in the first battery cell 1100.

Moreover, the determination unit 600 determines, on the basis of the second detection value, whether hydrogen sulfide is generated in the second battery cell 1200.

With the configuration described above, whether hydrogen sulfide is generated can be determined with higher accuracy. More specifically, since the detection and the determination are performed with use of the first resistance change member 110 and the second resistance change member 120 that are independent of the first power generation element 210 and the second power generation element 220, respectively, the results of the detection and the determination are not affected by variations of a resistance value, which are attributable to, e.g., a charge-discharge state or a deterioration state of the first power generation element 210 or the second power generation element 220. In other words, the detection and the determination can be performed in a state free from erroneous detection attributable to the electrodes. Therefore, when hydrogen sulfide is generated inside the first case or the second case and the electrical resistance of the first resistance change member 110 or the second resistance change member 120 is changed, such a situation can be detected and determined with higher accuracy. Furthermore, since the detection and the determination are performed with use of the first resistance change member 110 and the second resistance change member 120 that are independent of the first power generation element 210 and the second power generation element 220, respectively, it is possible to avoid degradation of the charge-discharge characteristics of the first power generation element 210 and the second power generation element 220 or obstruction to the charging and discharging operations thereof, the degradation and the obstruction being attributable to the operation of the detection unit(s). Thus, whether hydrogen sulfide is generated can be detected with high accuracy without causing influences on the charge-discharge characteristics and the charging and discharging operations of the first power generation element 210 and the second power generation element 220. As a result, whether hydrogen sulfide is generated can be determined for each of the battery cells with higher accuracy.

Figure 18:
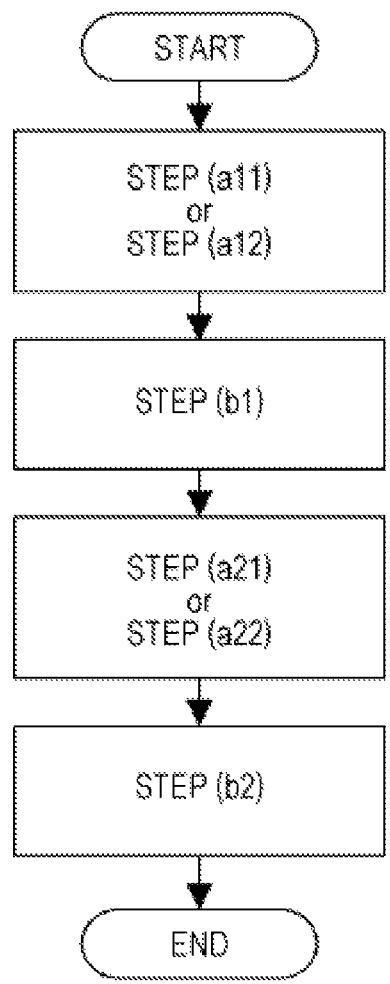
FIG. 18 is a flowchart illustrating a determination method according to the fourth embodiment.

FIG. 18 is a flowchart illustrating a determination method according to the fourth embodiment.

The determination method according to the fourth embodiment is a determination method using the determination system 6000, the determination system 6100, or the determination system 6200 according to the fourth embodiment. The determination method according to the fourth embodiment is, for example, a determination method that is executed in the determination system 6000, the determination system 6100, or the determination system 6200 according to the fourth embodiment.

The determination method according to the fourth embodiment includes the above-described detection method according to the fourth embodiment, a step (b1), and a step (b2).

The step (b1) is a step of, by the determination unit 600, determining, on the basis of the first detection value, whether hydrogen sulfide is generated in the first battery cell 1100.

The step (b2) is a step of, by the determination unit 600, determining, on the basis of the second detection value, whether hydrogen sulfide is generated in the second battery cell 1200.

Figure 19:
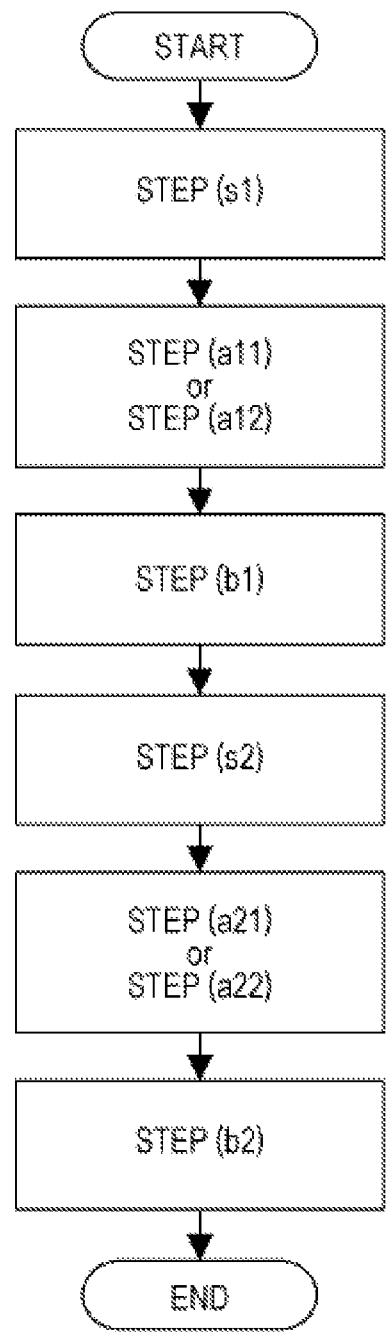
FIG. 19 is a flowchart illustrating a modification of the determination method according to the fourth embodiment.

FIG. 19 is a flowchart illustrating a modification of the determination method according to the fourth embodiment.

The determination method according to the modification, illustrated in FIG. 19, is a determination method using the determination system 6100 according to the fourth embodiment.

In the fourth embodiment, the determination unit 600 may be constituted by, e.g., an analog circuit or a digital circuit. The determination unit 600 may be constituted by, e.g., a processor and a memory. The processor may be, for example, a CPU (Central Processing Unit) or a MPU (Micro-Processing Unit). In that case, the processor may execute a control method (determination method), which is set forth in the present disclosure, by reading a program stored in the memory, and then executing the program.

Furthermore, in the fourth embodiment, the determination unit 600 may determine whether hydrogen sulfide is generated, on the basis of a variation of the first detection value or the second detection value (e.g., a voltage response or a current response), which has been detected for the predetermined time. The determination unit 600 may determine whether hydrogen sulfide is generated, for example, by judging whether the variation of the first detection value or the second detection value is normal. The determination unit 600 may determine whether hydrogen sulfide is generated, for example, by comparing the detected variation of the first detection value or the second detection value with information stored in the above-mentioned memory.

With the configuration described above, the variation of the first detection value or the second detection value, which indicates the generation of hydrogen sulfide, can be detected with higher accuracy. As a result, the accuracy in determining whether hydrogen sulfide is generated can be further increased.

The battery cell according to the present disclosure may be utilized to constitute an all-solid-state lithium secondary battery, for example.

What is claimed is:

1. A detection system comprising a battery module and a detection unit,
    wherein the battery module comprises a first battery cell and a second battery cell,
    wherein the first battery cell comprises:
        a first resistance change member having a first terminal and a second terminal;
        a first power generation element including a first positive electrode, a first negative electrode, and a first electrolyte interposed between the first positive electrode and the first negative electrode;
        a first case enclosing the first power generation element and the first resistance change member;
        a first positive electrode terminal having an end electrically connected to the first positive electrode and an end exposed to outside of the first case; and
        a first negative electrode terminal having an end electrically connected to the first negative electrode and an end exposed to the outside of the first case,
    wherein at least one of the first positive electrode, the first negative electrode, and the first electrolyte contains a first sulfur-based material,
        the first resistance change member contains a first resistance change material of which electrical resistance is changed by a chemical reaction with hydrogen sulfide,
        the first terminal of the first resistance change member and the second terminal of the first resistance change member are exposed to the outside of the first case, and
        the first resistance change member is not electrically connected to any of the first positive electrode terminal and the first negative electrode terminal,
    wherein the second battery cell comprises:
        a second resistance change member having a first terminal and a second terminal;
        a second power generation element including a second positive electrode, a second negative electrode, and a second electrolyte interposed between the second positive electrode and the second negative electrode;
        a second case enclosing the second power generation element and the second resistance change member;
        a second positive electrode terminal having an end electrically connected to the second positive electrode and an end exposed to outside of the second case; and
        a second negative electrode terminal having an end electrically connected to the second negative electrode and an end exposed to the outside of the second case,
    wherein at least one of the second positive electrode, the second negative electrode, and the second electrolyte contains a second sulfur-based material,
        the second resistance change member contains a second resistance change material of which electrical resistance is changed by a chemical reaction with hydrogen sulfide,
        the first terminal of the second resistance change member and the second terminal of the second resistance change member are exposed to the outside of the second case,
        the second resistance change member is not electrically connected to any of the second positive electrode terminal and the second negative electrode terminal, and
        one of the first positive electrode terminal and the first negative electrode terminal is electrically connected to one of the second positive electrode terminal and the second negative electrode terminal,
    wherein the detection unit performs an operation of applying a current between the first terminal of the first resistance change member and the second terminal of the first resistance change member, and detecting, as a first detection value, a voltage between the first terminal of the first resistance change member and the second terminal of the first resistance change member, or an operation of applying a voltage between the first terminal of the first resistance change member and the second terminal of the first resistance change member, and detecting, as the first detection value, a current between the first terminal of the first resistance change member and the second terminal of the first resistance change member,
    wherein the detection unit performs an operation of applying a current between the first terminal of the second resistance change member and the second terminal of the second resistance change member, and detecting, as a second detection value, a voltage between the first terminal of the second resistance change member and the second terminal of the second resistance change member, or an operation of applying a voltage between the first terminal of the second resistance change member and the second terminal of the second resistance change member, and detecting, as the second detection value, a current between the first terminal of the second resistance change member and the second terminal of the second resistance change member,
    wherein the detection system further comprises a connection state setting unit that sets a connection state between the detection unit and each of the first battery cell and the second battery cell,
    wherein the connection state setting unit sets the connection state to a first connection state in which the detection unit is connected to the first battery cell and the detection unit is not connected to the second battery cell,
    wherein, in the first connection state, the detection unit performs the operation of applying a current between the first terminal of the first resistance change member and the second terminal of the first resistance change member, and detecting, as the first detection value, a voltage between the first terminal of the first resistance change member and the second terminal of the first resistance change member, or the operation of applying a voltage between the first terminal of the first resistance change member and the second terminal of the first resistance change member, and detecting, as the first detection value, a current between the first terminal of the first resistance change member and the second terminal of the first resistance change member, wherein the connection state setting unit further sets the connection state to a second connection state in which the detection unit is not connected to the first battery cell and the detection unit is connected to the second battery cell, and wherein, in the second connection state, the detection unit performs the operation of applying a current between the first terminal of the second resistance change member and the second terminal of the second resistance change member, and detecting, as the second detection value, a voltage between the first terminal of the second resistance change member and the second terminal of the second resistance change member, or the operation of applying a voltage between the first terminal of the second resistance change member and the second terminal of the second resistance change member, and detecting, as the second detection value, a current between the first terminal of the second resistance change member and the second terminal of the second resistance change member.

2. The detection system according to claim 1, wherein the first resistance change member has a mesh structure containing the first resistance change material, or a porous structure containing the first resistance change material.

3. The detection system according to claim 1, wherein the first resistance change material is at least one metal or an alloy of two or more metals selected from a group consisting of copper, nickel, iron, molybdenum, gold, silver, silicon, germanium, samarium, zirconium, tin, tantalum, lead, niobium, nickel, neodymium, platinum, hafnium, palladium, magnesium, manganese, and lanthanum.

4. The detection system according to claim 1, wherein the detection unit includes a first detection unit and a second detection unit, the first detection unit performs the operation of applying a current between the first terminal of the first resistance change member and the second terminal of the first resistance change member, and detecting, as the first detection value, a voltage between the first terminal of the first resistance change member and the second terminal of the first resistance change member, or the operation of applying a voltage between the first terminal of the first resistance change member and the second terminal of the first resistance change member, and detecting, as the first detection value, a current between the first terminal of the first resistance change member and the second terminal of the first resistance change member, and the second detection unit performs the operation of applying a current between the first terminal of the second resistance change member and the second terminal of the second resistance change member, and detecting, as the second detection value, a voltage between the first terminal of the second resistance change member and the second terminal of the second resistance change member, or the operation of applying a voltage between the first terminal of the second resistance change member and the second terminal of the second resistance change member, and detecting, as the second detection value, a current between the first terminal of the second resistance change member and the second terminal of the second resistance change member.

5. A determination system comprising the detection system according to claim 1; and a determination unit, wherein the determination unit determines, on the basis of the first detection value, whether hydrogen sulfide is generated in the first battery cell, and the determination unit determines, on the basis of the second detection value, whether hydrogen sulfide is generated in the second battery cell.

* * * * *